(12) United States Patent
Katagiri et al.

(10) Patent No.: US 7,433,600 B2
(45) Date of Patent: Oct. 7, 2008

(54) OPTICAL NODE DEVICE AND SYSTEM INCLUDING THE DEVICE

(75) Inventors: Toru Katagiri, Kawasaki (JP); Hiroaki Tomofuji, Kawasaki (JP); Hiroshi Onaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 577 days.

(21) Appl. No.: 09/960,405

(22) Filed: Sep. 24, 2001

(65) Prior Publication Data

US 2002/0093707 A1 Jul. 18, 2002

(30) Foreign Application Priority Data

Jan. 12, 2001 (JP) .............................. 2001-004711

(51) Int. Cl.
H04J 14/02 (2006.01)
H04B 10/20 (2006.01)

(52) U.S. Cl. .......................................... 398/85; 398/59
(58) Field of Classification Search .................. 398/59, 398/79, 83–85
See application file for complete search history.

(56) References Cited

U.S. PATENT DOCUMENTS

| | | | | |
|---|---|---|---|---|
| 4,945,531 A * | 7/1990 | Suzuki | ......................... | 398/91 |
| 5,917,625 A * | 6/1999 | Ogusu et al. | .................... | 385/24 |
| 6,211,980 B1 * | 4/2001 | Terahara | ....................... | 398/82 |
| 6,351,323 B1 * | 2/2002 | Onaka et al. | ................... | 398/84 |
| 6,538,782 B1 * | 3/2003 | Otsuka et al. | .................. | 398/82 |
| 6,563,615 B2 * | 5/2003 | Milton et al. | ................... | 398/1 |
| 6,594,410 B2 * | 7/2003 | Kersey et al. | ................. | 385/15 |
| 6,674,968 B1 * | 1/2004 | Xie | .............................. | 398/79 |

FOREIGN PATENT DOCUMENTS

| | | | |
|---|---|---|---|
| JP | 11145910 A | | 5/1999 |
| JP | 11218790 A | * | 8/1999 |
| JP | 11289296 A | * | 10/1999 |
| JP | 2000082997 A | | 3/2000 |

\* cited by examiner

Primary Examiner—Christina Y Leung
(74) Attorney, Agent, or Firm—Staas & Halsey LLP

(57) ABSTRACT

Disclosed herein is an optical node device applicable to an optical network including a closed loop provided by an optical fiber. This optical node device includes a tunable wavelength selecting element adapted to input WDM signal light obtained by wavelength division multiplexing a plurality of optical signals having different wavelengths, the tunable wavelength selecting element having a function of dropping at least one optical signal from the WDM signal light and a function of adding at least one optical signal to at least one unassigned wavelength channel of the WDM signal light; and a wavelength selecting filter optically connected to the tunable wavelength selecting element for removing noise present in any bands other than a signal band of each optical signal passing through the tunable wavelength selecting element. With this configuration, the oscillation of optical power in the closed loop can be prevented by the use of the wavelength selecting filter for removing noise in any bands other than the signal band.

14 Claims, 20 Drawing Sheets

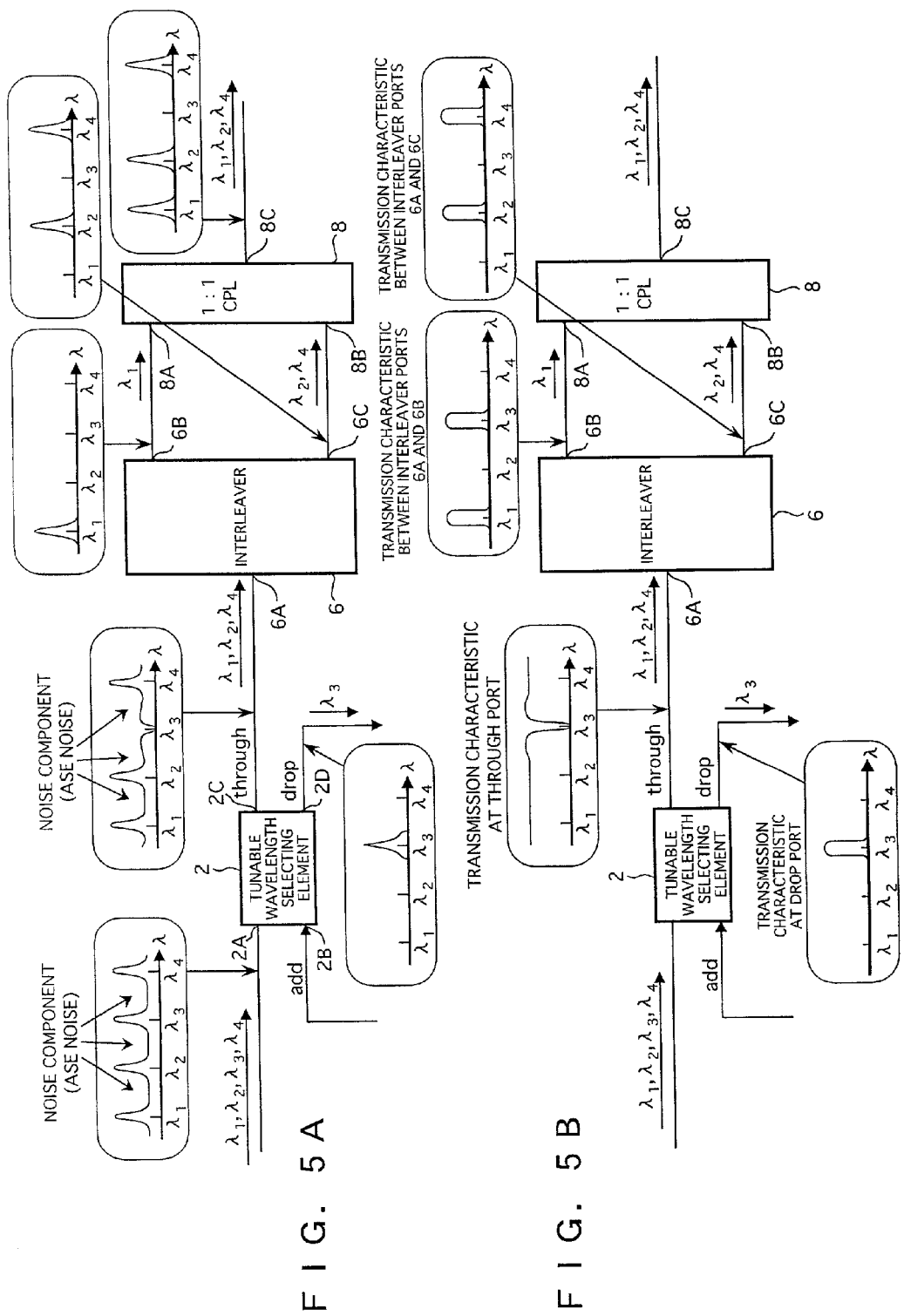

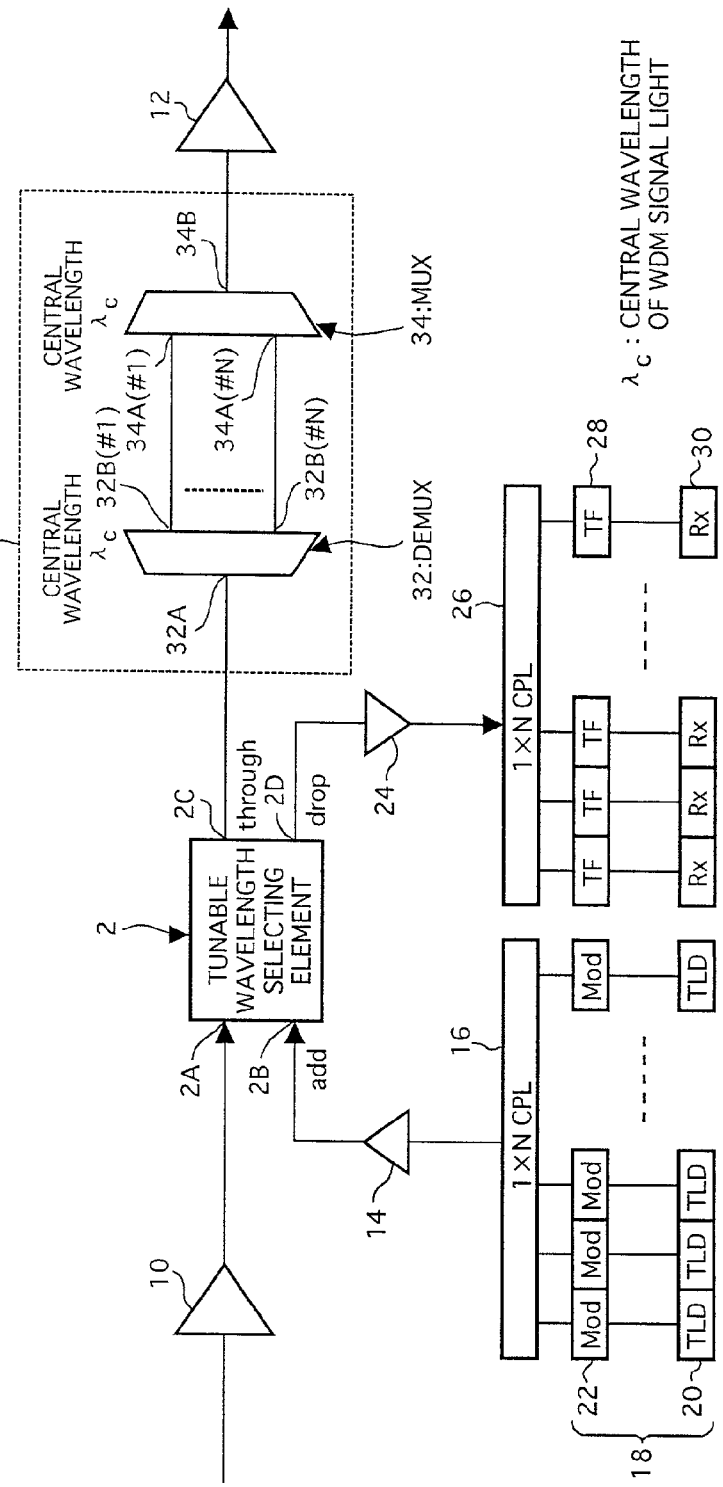

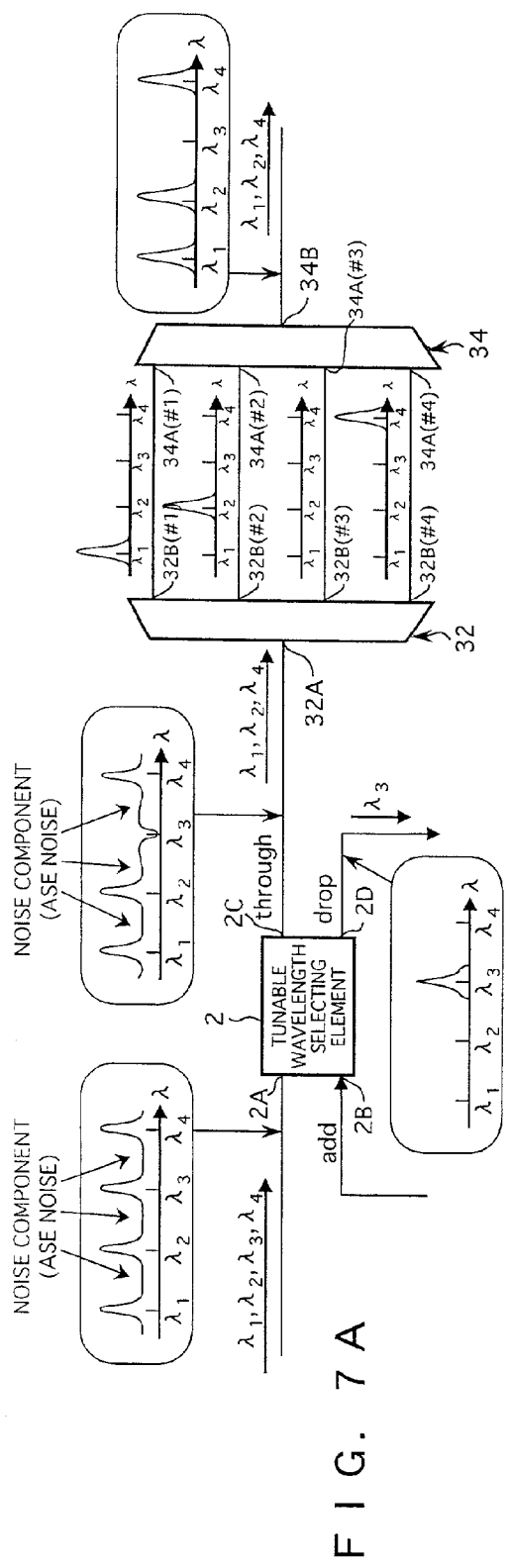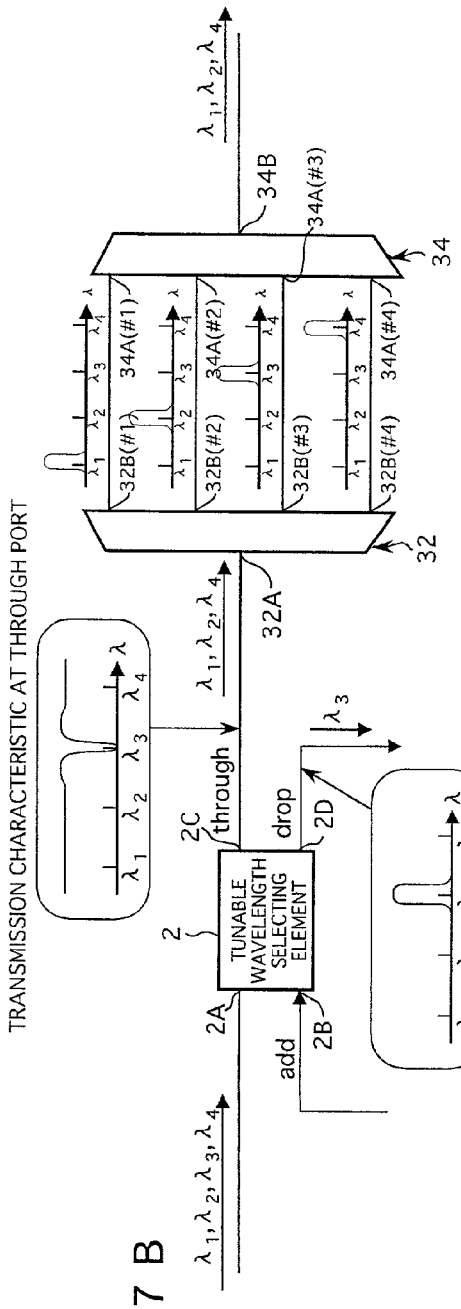

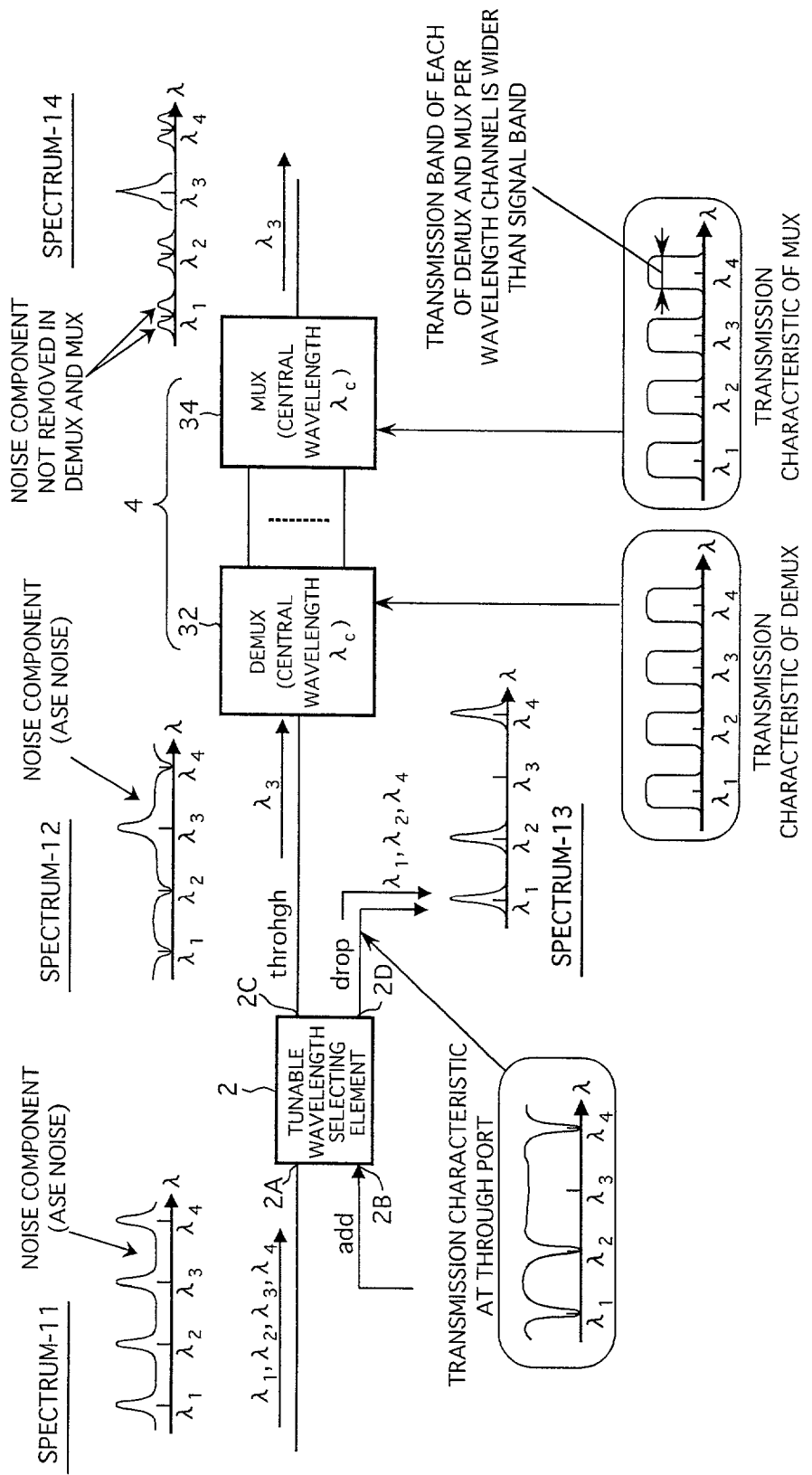

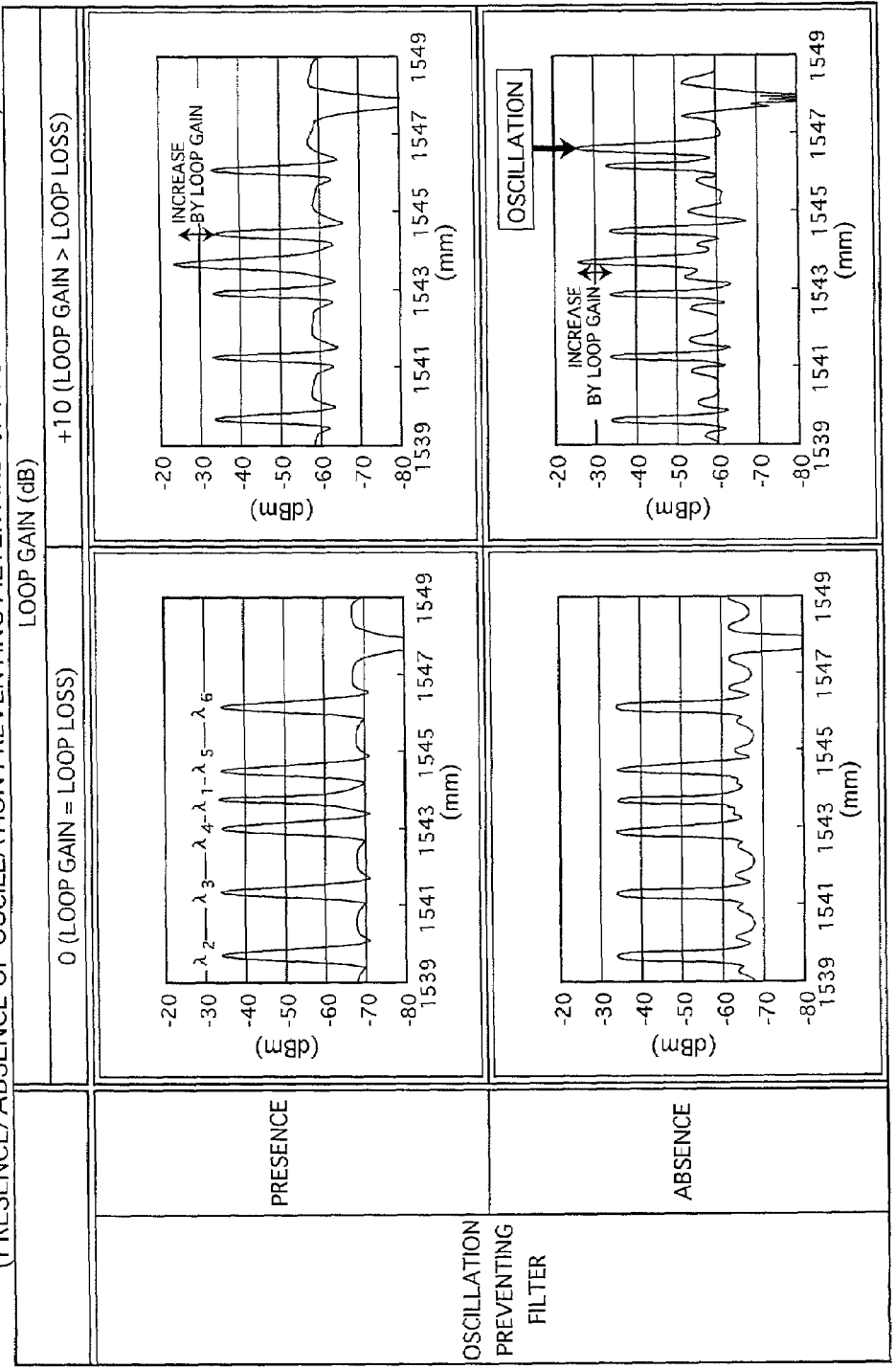

OPTICAL NODE DEVICE AND SYSTEM INCLUDING THE DEVICE

BACKGROUND OF THE INVENTION

1. Field of the Invention

The present invention relates to an optical node device and a system including the device.

2. Description of the Related Art

With a rapid increase in IP (Internet Protocol) traffic in recent years, the requirement for construction of a large-capacity, high-flexibility, and low-cost network has been increased. To meet this requirement, the construction of a WDM (wavelength division multiplexing)-based optical ring network is proceeding. In such a network, one wavelength of light is allocated to one path, and an optical node device for adding/dropping an optical signal (i.e., path) having a desired wavelength at an arbitrary node on the network therefore plays an important role. As the optical node device having such a function, an optical ADM (OADM: Optical Add/Drop Multiplexer) is known. The OADM has an all-optical function of adding/dropping an optical signal having a desired wavelength.

FIG. 1 is a block diagram of an optical node device in the prior art. WDM signal light obtained by wavelength division multiplexing a plurality of optical signals having different wavelengths $\lambda_1$ to $\lambda_N$ is input from an input optical transmission line through an optical amplifier into a tunable wavelength selecting element. Optical signals having arbitrary wavelengths (e.g., $\lambda_2$ and $\lambda_3$ as shown in FIG. 1) to be dropped in this node are output from a drop port ("drop" shown in FIG. 1) of the tunable wavelength selecting element, and optical signals having arbitrary wavelengths (e.g., $\lambda_4$ and $\lambda_5$ as shown in FIG. 1) to be added in this node are input to an add port ("add" shown in FIG. 1) of the tunable wavelength selecting element.

The optical signals output from the drop port are supplied through an optical amplifier to a 1×N optical coupler (1×N CPL), in which the optical signals are split into N channels. The split N channels are next selectively passed through tunable filters (TF) and next received by optical receivers (Rx).

The optical signals to be added in this node are obtained by modulating CW light (continuous-wave light) having desired wavelengths output from tunable laser diodes (TLD), by means of optical modulators (Mod). The resulting plural optical signals are combined by a 1×N optical coupler (1×N CPL), and the resulting light is next supplied through an optical amplifier to the add port of the tunable wavelength selecting element.

The optical signals passing through the tunable wavelength selecting element are combined with the optical signals supplied to the add port, and all the optical signals thus combined are next output from a through port ("through" shown in FIG. 1) of the tunable wavelength selecting element. The optical signals output from the through port are output through an optical amplifier to an output optical transmission line.

In the case of using the optical node device shown in FIG. 1 as each node in a WDM optical network, it is not necessary to terminate (opto/electrical convert or electro/optical convert) the optical signals at all the nodes, but it is sufficient to terminate the optical signals at only the nodes corresponding to a transmitting end and a receiving end for the optical signals (or paths). Accordingly, in comparison with a network based on a SONET (Synchronous Optical NETwork)/SDH (Synchronous Digital Hierarchy) technique requiring the termination of optical signals at all the nodes, a node cost can be greatly reduced.

However, in the case of applying the optical node device to an optical network (e.g., WDM optical ring network) including a closed loop provided by an optical fiber, there is a problem that the oscillation of optical power occurs when the following three conditions are satisfied.

(1) Optical signals are not terminated at each optical node device.

(2) A loop gain in the closed loop is larger than a loop loss.

(3) There exists an optical signal band not added/dropped in any optical node device (e.g., optical amplifier induced ASE noise present in a band between adjacent wavelength channels).

Referring to FIG. 2, there is shown a WDM optical ring network in which the oscillation of optical power occurs. Nodes A, B, C, and D are arranged clockwise in this order along a closed loop provided by an optical fiber. In this case, optical signals having four wavelengths $\lambda_1$ to $\lambda_4$ are added to the node A, and all of the four wavelength channels $\lambda_1$ to $\lambda_4$ are dropped from the node D.

As shown in spectrum-1 appearing immediately after the optical signals are output from the node A, the spectrum is not strongly affected by ASE noise generated from the optical node device or an optical amplifier inserted in the optical transmission line. However, as shown in spectrum-2 and spectrum-3, ASE noise generated from a plurality of optical amplifiers (not shown) arranged along the closed loop is accumulated with the transmission of the optical signals. Spectrum-4 shows the spectrum of the optical signals dropped from the node D, and spectrum-5 shows the spectrum of the light passed through the node D. Since all of the optical signals of the four wavelength channels are dropped from the node D, the spectrum-5 includes only the ASE noise in general. When the above-mentioned three conditions are satisfied in such circumstances, the oscillation of optical power occurs (see spectrum-6).

FIG. 3 shows an example of the transmission characteristics of an AOTF (acousto-optic tunable filter) as the tunable wavelength selecting element. More specifically, there are shown the transmission characteristics at the add port, the drop port, and the through port of the AOTF for the four wavelength channels of wavelengths $\lambda_1$ to $\lambda_4$. In the transmission characteristic at the through port, the relation between a wavelength spacing ($\Delta\lambda$) and a rejection band width ($\Delta w$) is $\Delta w < \Delta\lambda$. With this transmission characteristic at the through port, the signal components of the wavelengths to be rejected can be sufficiently removed, and coherent crosstalk can therefore be suppressed to thereby minimize the influence of a certain one of the wavelength channels to the other wavelength channels (the wavelength channels passing through the tunable wavelength selecting element).

On the other hand, ASE noise present in any bands other than the signal bands to be rejected, i.e., in each band between the adjacent wavelength channels, is not suppressed, but passed through the tunable wavelength selecting element. When the ASE noise passed through the tunable wavelength selecting element is circulated within a WDM optical ring network satisfying the condition of (loop loss)<(loop gain), the ASE noise is accumulated with the recirculation in the ring network, and this accumulation of the ASE noise is associated with the amplifying operation of the optical amplifiers to finally cause the oscillation of optical power.

SUMMARY OF THE INVENTION

It is therefore an object of the present invention to provide an optical node device which can prevent the oscillation of optical power in an optical network including a closed loop provided by an optical fiber.

It is another object of the present invention to provide a system including such an optical node device.

Other objects of the present invention will become apparent from the following description.

In accordance with a first aspect of the present invention, there is provided an optical node device applicable to an optical network including a closed loop provided by an optical fiber. This optical node device comprises a tunable wavelength selecting element adapted to input WDM signal light obtained by wavelength division multiplexing a plurality of optical signals having different wavelengths, the tunable wavelength selecting element having a function of dropping at least one optical signal from the WDM signal light and a function of adding at least one optical signal to at least one unassigned wavelength channel of the WDM signal light; and a wavelength selecting filter optically connected to the tunable wavelength selecting element for removing noise present in any bands other than a signal band of each optical signal passing through the tunable wavelength selecting element.

With this configuration, the oscillation of optical power in the closed loop can be prevented by the use of the wavelength selecting filter for removing noise present in any bands other than the signal band. Thus, one of the objects of the present invention can be achieved.

In accordance with a second aspect of the present invention, there is provided a system comprising a closed loop provided by an optical fiber; and a plurality of optical node devices arranged along the closed loop. At least one of the plurality of optical node devices comprises the optical node device according to the first aspect of the present invention.

In accordance with a third aspect of the present invention, there is provided an optical node device applicable to an optical network including a closed loop provided by an optical fiber. This optical node device comprises an optical demultiplexer having an input port for inputting WDM signal light obtained by wavelength division multiplexing N (N is an integer satisfying 1<N) optical signals having different wavelengths and N output ports for respectively outputting the N optical signals separated from the WDM signal light; N 2×2 optical switches each having first and second input ports and first and second output ports, the N optical signals output from the optical demultiplexer being supplied to the first input ports of the N 2×2 optical switches, respectively, each of the N 2×2 optical switches switching between a bar state where the first and second input ports are connected to the first and second output ports, respectively, and a cross state where the first and second input ports are connected to the second and first output ports, respectively; and an optical multiplexer having N input ports for respectively inputting N optical signals output from the first output ports of the N 2×2 optical switches, and an output port for outputting WDM signal light obtained by wavelength division multiplexing the N optical signals input to the N input ports.

In accordance with a fourth aspect of the present invention, there is provided a system comprising a closed loop provided by an optical fiber; and a plurality of optical node devices arranged along the closed loop. At least one of the plurality of optical node devices comprises the optical node device according to the third aspect of the present invention.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIGS. 5A and 5B are block diagrams showing spectra and transmission characteristics at various points in FIG. 4, respectively;

FIG. 6 is a block diagram showing a second preferred embodiment of the optical node device according to the present invention;

FIGS. 7A and 7B are block diagrams showing spectra and transmission characteristics at various points in FIG. 6, respectively;

FIG. 8 is a block diagram showing spectra in the case that a transmission band per wavelength channel is wider a signal band;

FIG. 20 is an illustration of experimental results in the experimental system shown in FIG. 18.

DETAILED DESCRIPTION OF THE PREFERRED EMBODIMENTS

Some preferred embodiments of the present invention will now be described in detail.

Figure 4:
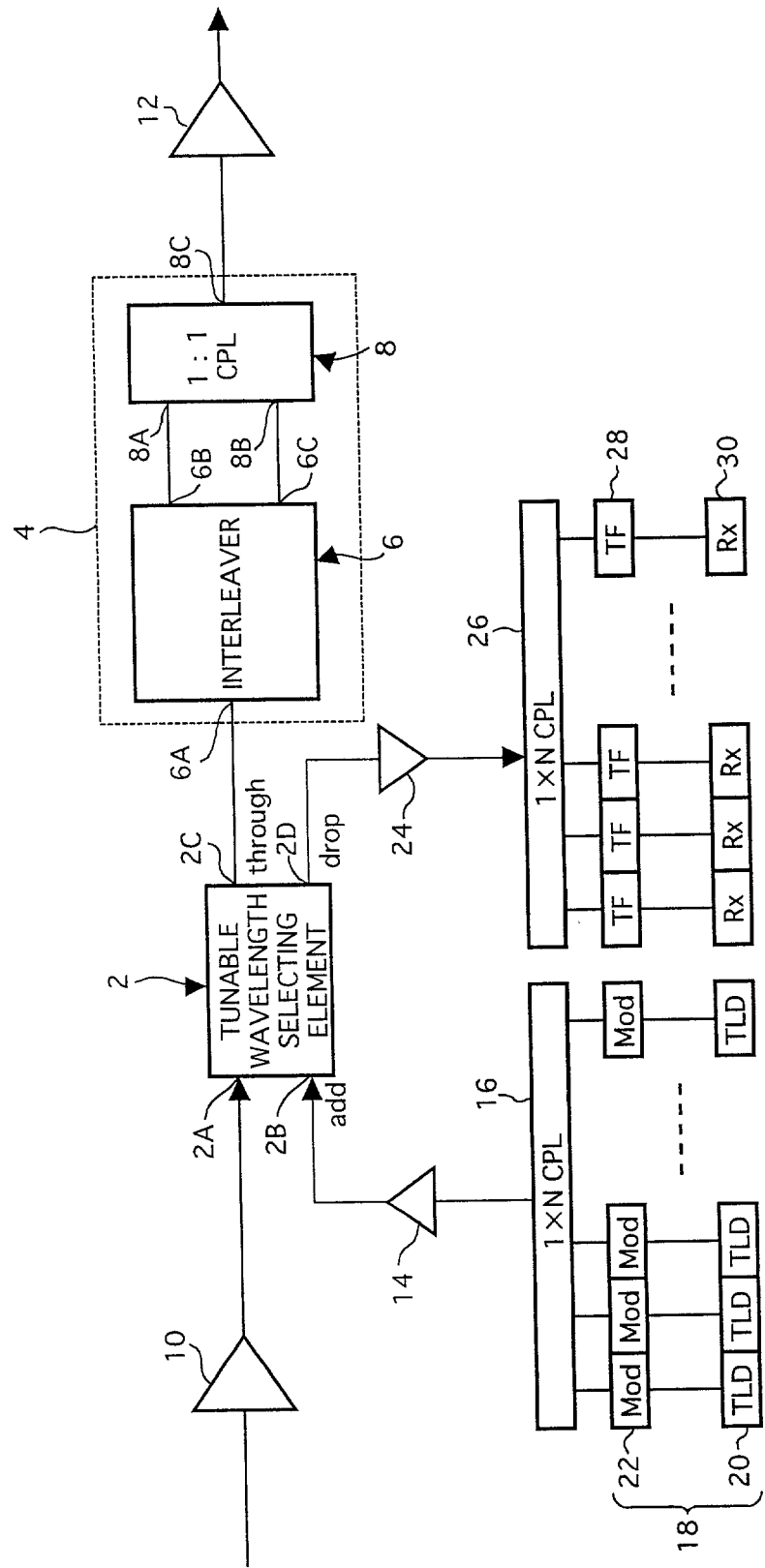
FIG. 4 is a block diagram showing a first preferred embodiment of the optical node device according to the present invention.

FIG. 4 is a block diagram showing a first preferred embodiment of the optical node device according to the present invention. This optical node device has a tunable wavelength selecting element 2 and a wavelength selecting filter 4. The tunable wavelength selecting element 2 is an AOTF, for example, and it has two input ports 2A and 2B and two output ports 2C and 2D.

WDM signal light obtained by wavelength division multiplexing a plurality of optical signals having different wavelengths is supplied to the input port 2A. The other input port 2B functions as an add port, and the output ports 2C and 2D function as a through port and a drop port, respectively. Thus, the tunable wavelength selecting element 2 has a first function of dropping at least one optical signal from the WDM signal light supplied to the input port 2A and outputting this dropped optical signal from the output port 2D, and a second function of adding at least one optical signal supplied to the input port 2B to at least one unassigned wavelength channel of the WDM signal light and outputting this added optical signal with the WDM signal light from the output port 2C.

The wavelength selecting filter 4 includes an interleaver 6 and a 1:1 optical coupler (CPL) 8. The interleaver 6 has an input port 6A and two output ports 6B and 6C. The optical coupler 8 has two input ports 8A and 8B and an output port 8C. The input port 6A of the interleaver 6 is connected to the output port 2C of the tunable wavelength selecting element 2, and the two output ports 6B and 6C of the interleaver 6 are connected to the two input ports 8A and 8B of the optical coupler 8, respectively.

An optical amplifier 10 is connected to the input port 2A of the tunable wavelength selecting element 2, so as to amplify the WDM signal light to be supplied to this optical node device, and an optical amplifier 12 is connected to the output port 8C of the optical coupler 8, so as to amplify the WDM signal light to be output from this optical node device.

A 1×N optical coupler 16 is connected through an optical amplifier 14 to the input port 2B of the tunable wavelength selecting element 2. The optical coupler 16 has an output port connected through the optical amplifier 14 to the input port 2B of the tunable wavelength selecting element 2, and a plurality of input ports. An optical transmitter 18 is connected to each of the plural input ports of the optical coupler 16. Each optical transmitter 18 includes a tunable laser diode (TLD) 20 as a tunable light source and an optical modulator (Mod) 22 for modulating CW light (continuous-wave light) output from the tunable laser diode 20, according to a modulating signal.

Similarly, a 1×N optical coupler 26 is connected through an optical amplifier 24 to the output port 2D of the tunable wavelength selecting element 2. The optical coupler 26 has an input port connected through the optical amplifier 24 to the output port 2D of the tunable wavelength selecting element 2, and a plurality of output ports. An optical receiver (Rx) 30 is connected through a tunable filter (TF) 28 to each output port of the optical coupler 26.

An acousto-optic tunable filter (AOTF) may be used as the tunable wavelength selecting element 2. For example, the AOTF has an optical waveguide and a waveguide structure for a surface acoustic wave (SAW) propagating in relation to this optical waveguide on a substrate. The optical waveguide suitable for the AOTF may be obtained, for example, by thermally diffusing Ti on a $LiNbO_3$ substrate having birefringence of light. Further, an interdigital transducer (IDT) is formed on the substrate to propagate the surface acoustic wave in relation to the optical waveguide. The surface acoustic wave generated by the IDT is propagated in a predetermined path by a SAW guide, and absorbed by a SAW absorber to be converted into heat.

By the propagation of the surface acoustic wave in relation to the optical waveguide, light having a specific wavelength determined according to the power and frequency of the surface acoustic wave and the birefringence of the optical waveguide is subjected to mode conversion from a TE mode to a TM mode or vice versa. Accordingly, by extracting this mode-converted light with a specific means such as a polarized beam splitter, WDM signal light of plural channels can be split into selected light and unselected light, for example. Since the wavelength of the selected light depends on the frequency of the surface acoustic wave, the wavelength of the selected light is tunable according to the frequency of the surface acoustic wave.

The wavelength channels of the WDM signal light are arranged at substantially equal intervals in the wavelength domain. In this case, the function as the wavelength selecting filter 4 is obtained by wavelength coupling between the ports of the interleaver 6. More specifically, the input port 6A and the output port 6B of the interleaver 6 are coupled by a transmission band including the wavelength of any odd-numbered one of the wavelength channels, and the input port 6A and the output port 6C of the interleaver 6 are coupled by a transmission band including the wavelength of any even-numbered one of the wavelength channels.

The WDM signal light supplied from an optical transmission line to this optical node device is input through the optical amplifier 10 into the tunable wavelength selecting element 2. Of the input WDM signal light, an optical signal having a wavelength to be dropped (selected) in this optical node device is output from the output port 2D of the tunable wavelength selecting element 2, so that the optical signal having the wavelength to be dropped is extracted (suppressed) from the WDM signal light passing through this optical node device. Optical signals having one or more arbitrary wavelengths are output from the output port 2D in the wavelength division multiplexed condition, and supplied through the optical amplifier 24 to the optical coupler 26, in which the WDM signal light is split into N channels. The split N channels are next input into the tunable filters 28, respectively, to select optical signals having desired wavelengths, which are next received by the optical receivers 30, respectively.

Optical signals to be added in this optical node device are supplied from the optical transmitters 18 through the optical coupler 16 and the optical amplifier 14 in this order to the input port 2B of the tunable wavelength selecting element 2. The optical signals thus supplied to the tunable wavelength selecting element 2 are combined with the WDM signal light passing through this optical node device, and the resulting WDM signal light is output from the port 2C. The WDM signal light output from the port 2C is input to the wavelength selecting filter 4, so as to suppress a noise (ASE noise) component present in a band between any adjacent ones of the wavelength channels. After suppressing the noise by the wavelength selecting filter 4, the WDM signal light is output through the optical amplifier 12 to the optical transmission line.

Referring to FIGS. 5A and 5B, there are shown spectra and filter transmission characteristics at various points in the optical node device shown in FIG. 4, respectively. In this case, WDM signal light having four wavelength channels of wavelengths $\lambda_1$ to $\lambda_4$ including a noise component (ASE noise) is input into the optical node device, and the optical signal having the wavelength $\lambda_3$ only is dropped in the optical node device, whereas the remaining optical signals having the wavelengths $\lambda_1$, $\lambda_2$, and $\lambda_4$ are passed through the optical node device.

As shown in FIG. 5A, the WDM signal light having the four wavelength channels of the wavelengths $\lambda_1$ to $\lambda_4$ is input to the port 2A of the tunable wavelength selecting element 2. Of the four optical signals of the input WDM signal light, only the optical signal having the wavelength $\lambda_3$ to be dropped is extracted (suppressed) from the port 2D, and the remaining optical signals having the wavelengths $\lambda_1$, $\lambda_2$, and $\lambda_4$ are output from the port 2C.

As shown in FIG. 5B, the tunable wavelength selecting element 2 has a transmission characteristic at the through port such that only a band including the wavelength $\lambda_3$ is extracted (suppressed) and the remaining bands are passed. Accordingly, as shown in FIG. 5A, the spectrum of the through output from the tunable wavelength selecting element 2 includes the ASE noise present in a band between the adjacent signal wavelengths.

The through output from the tunable wavelength selecting element 2 is input into the interleaver 6. As shown in FIG. 5A, the interleaver 6 has an output characteristic such that the wavelength ($\lambda_1$) of the odd-numbered channel is output from the port 6B and the wavelengths ($\lambda_2$ and $\lambda_4$) of the even-numbered channels are output from the port 6C. As shown in FIG. 5B, the interleaver 6 has a transmission characteristic such that only a signal band of each wavelength channel is passed, so that the ASE noise present in the band between the adjacent wavelength channels is suppressed in the interleaver 6. The outputs from the ports 6B and 6C of the interleaver 6 are combined in the 1:1 optical coupler 8, and WDM signal light including the signal components of the wavelengths $\lambda_1$, $\lambda_2$, and $\lambda_4$ are output from the optical coupler 8 in the condition where the ASE noise present in the band between the adjacent wavelength channels has been suppressed.

Thus, the noise component present in the band between the adjacent wavelength channels is suppressed. Accordingly, in the case that this optical node device is applied to a WDM optical ring network, unwanted light such as ASE noise is prevented from circulating within the optical ring network, thereby allowing the suppression of oscillation of optical power.

A similar effect can be obtained also in the case that the interleaver 6 is replaced by an AWG (arrayed waveguide grating) having one input and two outputs whose FSR (free spectral range) is equal to a wavelength spacing.

FIG. 6 is a block diagram showing a second preferred embodiment of the optical node device according to the present invention. In this preferred embodiment, the wavelength selecting filter 4 includes an optical demultiplexer (DEMUX) 32 having an input port 32A and N (N is the number of WDM channels) output ports 32B(#1) to 32B(#N), and an optical multiplexer (MUX) 34 having N input ports 34A(#1) to 34A(#N) and an output port 34B.

The output ports 32B(#1) to 32B(#N) of the optical demultiplexer 32 are connected to the input ports 34A(#1) to 34A(#N) of the optical multiplexer 34, respectively. The WDM signal light from the port 2C of the tunable wavelength selecting element 2 is input to the input port 32A of the optical demultiplexer 32, and the WDM signal light output from the output port 34B of the optical multiplexer 34 is supplied to the optical amplifier 12.

An AWG may be used as each of the optical demultiplexer 32 and the optical multiplexer 34. The central wavelength of the AWG is set substantially equal to the central wavelength $\lambda_C$ of the WDM signal light. Also in this preferred embodiment, the ASE noise present in the band between the adjacent wavelength channels of the WDM signal light can be removed to thereby suppress the oscillation of optical power in an optical ring network. This will now be described more specifically.

FIGS. 7A and 7B show spectra and filter transmission characteristics at various points in the optical node device shown in FIG. 6, respectively. In this case, WDM signal light having four wavelength channels of wavelengths $\lambda_1$ to $\lambda_4$ including a noise component such as ASE noise is input into the tunable wavelength selecting element 2, and the optical signal having the wavelength $\lambda_3$ is dropped from the port 2D, whereas the remaining optical signals having the wavelengths $\lambda_1$, $\lambda_2$, and $\lambda_4$ are output from the port 2C. As shown in FIG. 7B, the tunable wavelength selecting element 2 has a transmission characteristic at the through port such that the bands other than the band including the optical signal having the wavelength $\lambda_3$ are passed. Accordingly, the optical signals (WDM signal light) output from the port 2C include a noise component.

The WDM signal light having the three wavelengths $\lambda_1$, $\lambda_2$, and $\lambda_4$ including the noise component is input into the optical demultiplexer 32. In the optical demultiplexer 32, the input WDM signal light is separated into the optical signals of the three wavelengths $\lambda_1$, $\lambda_2$, and $\lambda_4$, and these optical signals of the wavelengths $\lambda_1$, $\lambda_2$, and $\lambda_4$ are output from the output ports 32B(#1), 32B(#2), and 32B(#4), respectively. These optical signals of the wavelengths $\lambda_1$, $\lambda_2$, and $\lambda_4$ are next input to the input ports 34A(#1), 34A(#2), and 34A(#4) of the optical multiplexer 34, respectively, and multiplexed again to be output from the output port 34B. As shown in FIG. 7B, each of the optical demultiplexer 32 and the optical multiplexer 34 has a transmission characteristic such that only the signal bands are passed. As a result, the WDM signal light output from the optical multiplexer 34 substantially excludes a noise component. Accordingly, it is possible to prevent the noise component present in the band between the adjacent wavelength channels from circulating within an optical ring network, thereby effectively suppressing the oscillation of optical power.

A similar effect can be obtained also in the case that an AOTF is operated so that only the optical signals passing through the optical node device are transmitted by using the drop port of the AOTF.

While the number N of WDM channels is 4 in the case of FIGS. 7A and 7B, the number N shown is illustrative and not limitative. It should be noted that the number N is defined as an integer greater than 1.

In the preferred embodiment shown in FIG. 6, the optical demultiplexer 32 and the optical multiplexer 34 may be provided by AWGs having substantially the same optical characteristics. However, in the case that the signal transmission band of each AWG is sufficiently wider than the signal band, not only the signal component, but also a noise component present in a band near the signal wavelength is transmitted. This will now be described more specifically with reference to FIG. 8.

FIG. 8 shows spectra at various points in the optical node device in the case that the transmission band of each of the optical demultiplexer 32 and the optical multiplexer 34 per wavelength channel is wider than the signal band. As shown in spectrum-11, WDM signal light having four wavelength channels of wavelengths $\lambda_1$ to $\lambda_4$ including noise is input into the tunable wavelength selecting element 2. As shown in spectrum-13, the optical signals having the wavelengths $\lambda_1$, $\lambda_2$, and $\lambda_4$ are dropped from the port 2D. As shown in spectrum-12, the optical signal having the wavelength $\lambda_3$ only is passed through the tunable wavelength selecting element 2 (i.e., output from the through port 2C).

In the case that the transmission band of each of the optical demultiplexer 32 and the optical multiplexer 34 per wavelength channel is sufficiently wider than the signal band, the WDM signal light output from the optical multiplexer 34 includes a noise component near the central wavelength of each optical signal as shown in spectrum-14. If this noise component circulates within a WDM optical ring network, there is a possibility of the oscillation of optical power. A preferred embodiment for solving this problem will now be described.

Figure 9:
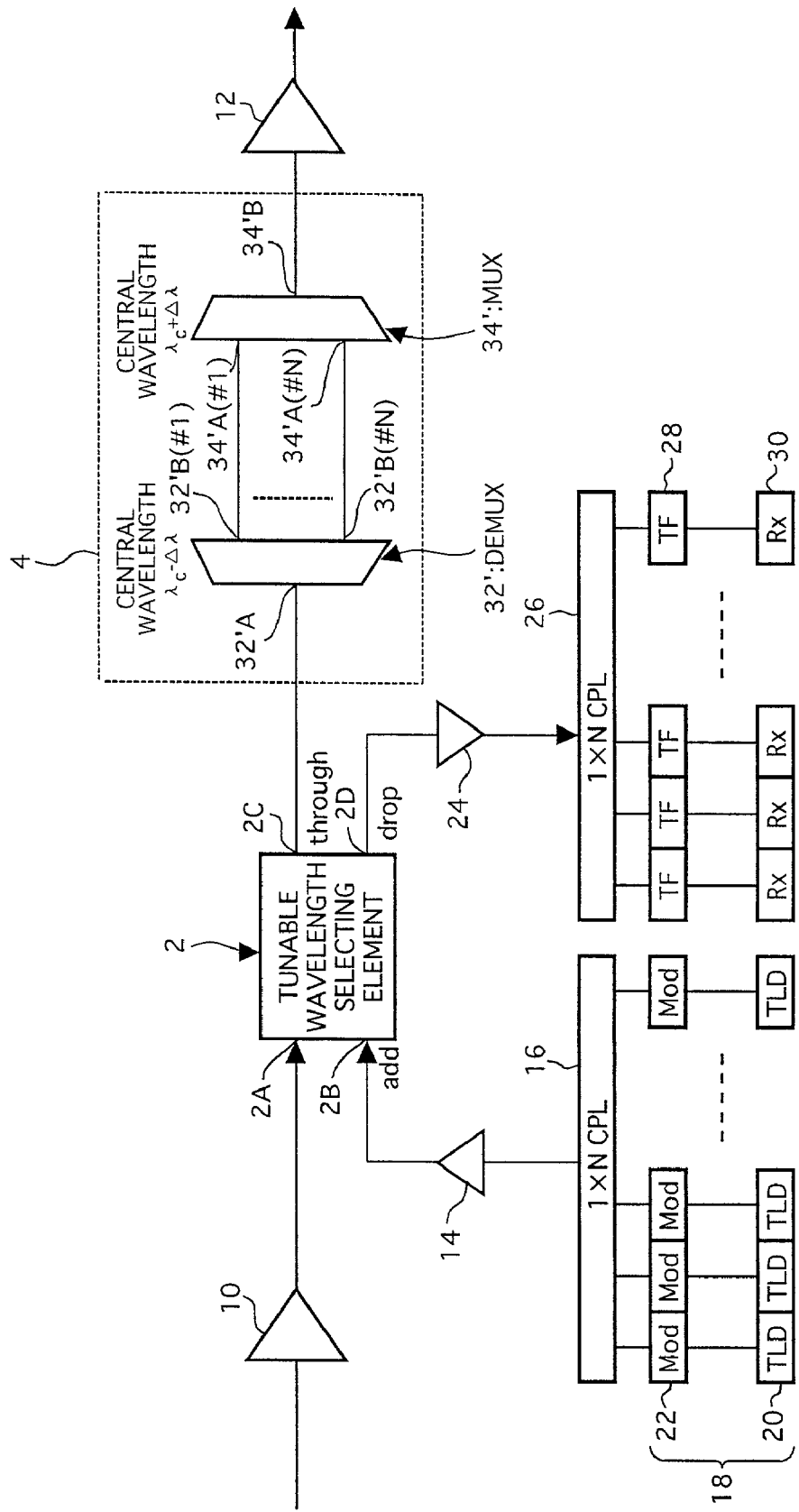
FIG. 9 is a block diagram showing a third preferred embodiment of the optical node device according to the present invention.

FIG. 9 is a block diagram showing a third preferred embodiment of the optical node device according to the present invention. In contrast to the preferred embodiment shown in FIG. 6 wherein the AWGs used as the optical demultiplexer 32 and the optical multiplexer 34 have substantially the same optical characteristics, the preferred embodiment shown in FIG. 9 employs two AWGs different in optical characteristics (more specifically, in central wavelength).

In the preferred embodiment shown in FIG. 9, the wavelength selecting filter 4 includes an optical demultiplexer 32' and an optical multiplexer 34' each provided by an AWG. As in the previous preferred embodiments, the wavelength channels of the WDM signal light are arranged at substantially equal intervals in the wavelength domain. The optical demultiplexer 32' has an input port 32'A and N output ports 32'B(#1) to 32'B(#N), where N is the number of WDM channels. The input port 32'A and the i-th (i is an integer satisfying $1 \leq i \leq N$) output port 32'B(#i) are coupled by a transmission band including the wavelength $\lambda_i$ channels.

The optical multiplexer 34' has N input ports 34'A(#1) to 34'A(#N) and an output port 34'B. The j-th (j is an integer satisfying $1 \leq j \leq N$) input port 34'A(#j) and the output port 34'B are coupled by a transmission band including the wavelength $\lambda_i$ channels.

In the case that the transmission band of each of the optical demultiplexer 32' and the optical multiplexer 34' per wavelength channel is wider than the band (signal band) of each wavelength channel of the WDM signal light, there is a possibility that the above-mentioned problem may arise. To cope with this problem, this preferred embodiment is configured so that the transmission band of the optical demultiplexer 32' per wavelength channel has a central wavelength substantially coinciding with a wavelength shorter than the central wavelength of each wavelength channel of the WDM signal light, and that the transmission band of the optical multiplexer 34' per wavelength channel has a central wavelength substantially coinciding with a wavelength longer than the central wavelength of each wavelength channel of the WDM signal light. This configuration will now be illustrated in FIG. 10.

Figure 10:
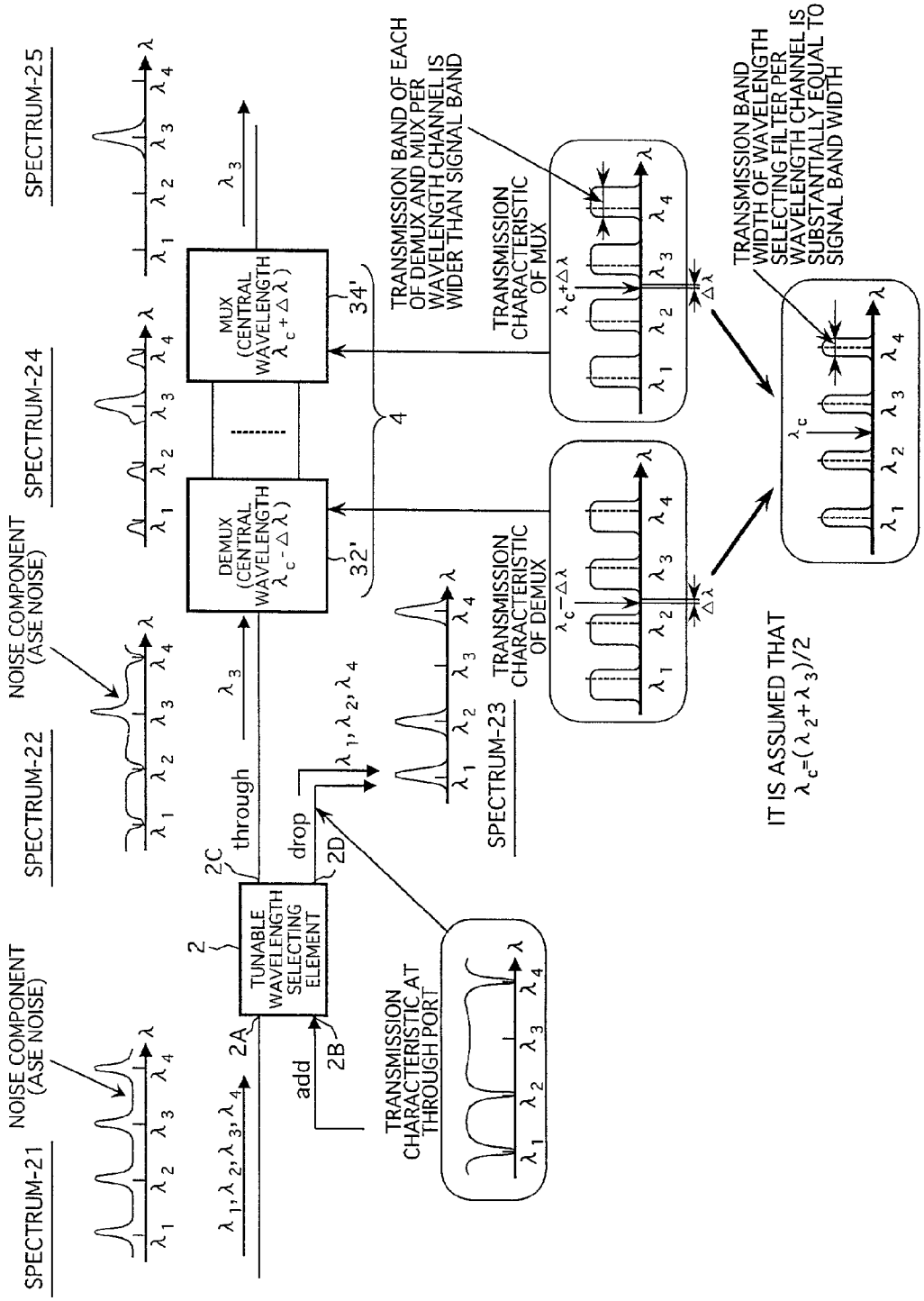
FIG. 10 is a block diagram showing spectra in the case of using an optical demultiplexer and an optical multiplexer each having a transmission band per wavelength channel wider than a signal band.

FIG. 10 shows spectral at various points in the optical node device in the case that a noise component is removed by using an AWG having a characteristic such that the transmission band per wavelength channel is wider than the signal band. In this case, it is assumed that the central wavelength of the optical demultiplexer 32' is ($\lambda_C - \Delta\lambda$) and the central wavelength of the multiplexer 34' is ($\lambda_C + \Delta\lambda$), where $\lambda_C$ is the central wavelength of the WDM signal light. In the case that the WDM signal light has four wavelength channels as shown, $\lambda_C = (\lambda_2 + \lambda_3)/2$.

As shown in FIG. 10, spectrum-21 at the input port 2A and spectrum-22 at the through port 2C are the same as the spectrum-11 and the spectrum-12 shown in FIG. 8, respectively. When the light having the spectrum-22 is input into the optical demultiplexer 321, spectrum-24 of the optical demultiplexer 32' shows that the noise component at shorter wavelengths with respect to the central wavelength of each optical signal is left and the noise component at longer wavelengths with respect to the central wavelength of each optical signal is removed. When the light having the spectrum-24 is input into the optical multiplexer 34', the noise component left at the shorter wavelengths mentioned above is removed, because the central wavelength of the optical multiplexer 34' is shifted from the central wavelength of the WDM signal light toward longer wavelengths. As a result, all the noise components present near the wavelength of each optical signal can be suppressed.

Accordingly, even in the case that each of the optical demultiplexer 32' and the optical multiplexer 34' is provided by an AWG having a characteristic such that the transmission band per wavelength channel is wider than the signal band, the noise component present near the central wavelength of each optical signal as shown in the spectrum-14 in FIG. 8 can be suppressed by preliminarily shifting the central wavelength of each AWG, thus effecting preventing the oscillation of optical power in a WDM optical ring network.

Figure 11:
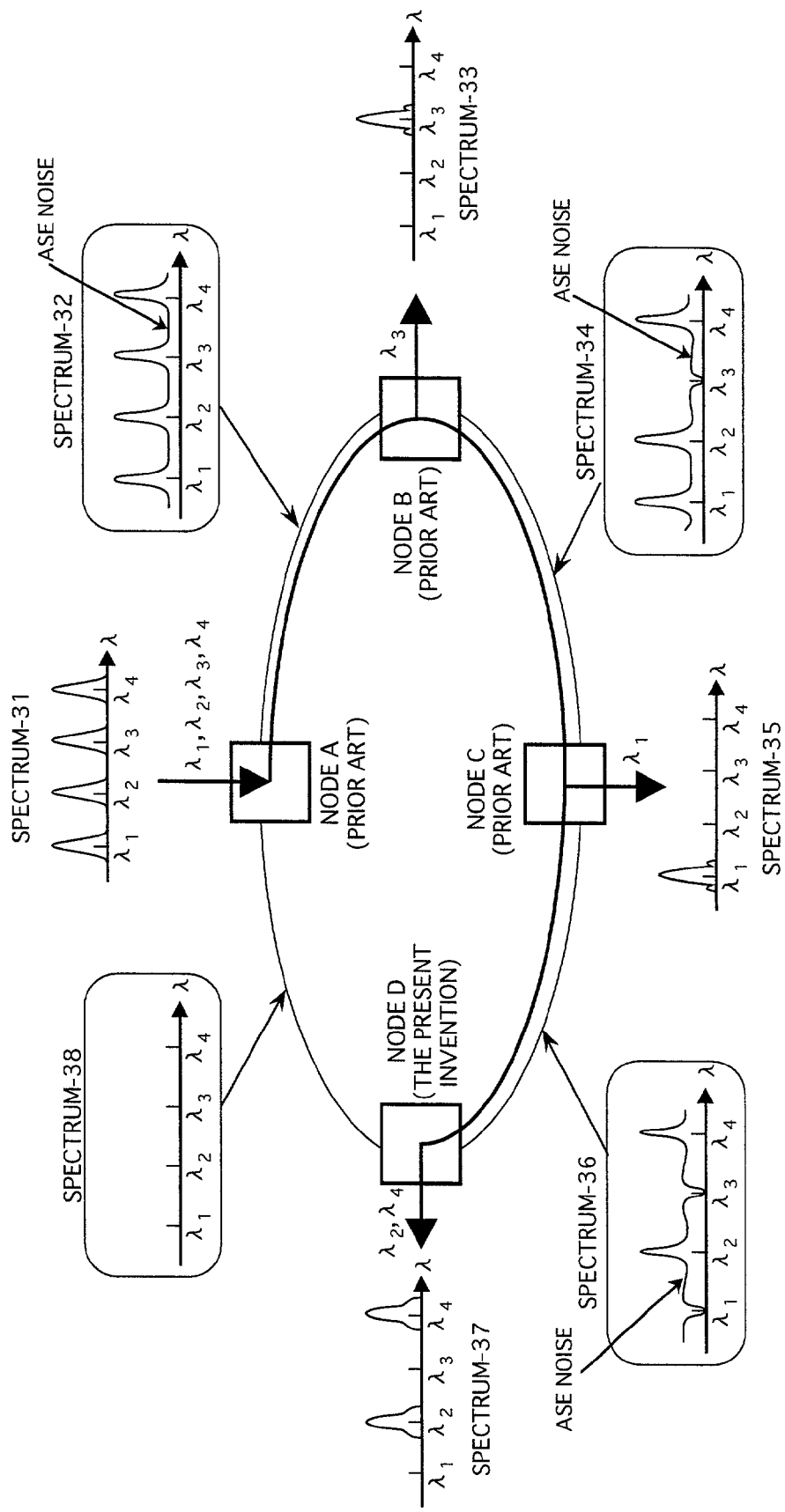
FIG. 11 is a block diagram showing a first preferred embodiment of the system according to the present invention.

Referring to FIG. 11, there is shown a first preferred embodiment of the system according to the present invention. A plurality of (e.g., four as shown) nodes A to D are arranged along a closed loop provided by an optical fiber, and the optical node device according to the present invention is used as at least one of these nodes A to D. In this preferred embodiment, the optical node device according to the present invention is used as the node D. Specifically, this system is a WDM optical ring network, and at least one optical amplifier (not shown) is arranged along the closed loop.

In this preferred embodiment, WDM signal light having four wavelength channels of wavelengths $\lambda_1$ to $\lambda_4$ is input into the node A, the wavelength $\lambda_3$ is dropped from the node B, the wavelength $\lambda_1$ is dropped from the node C, and the wavelengths $\lambda_2$ and $\lambda_4$ are dropped from the node D.

The WDM signal light (spectrum-31) added to the node A propagates clockwise in the ring network. During the propagation of the WDM signal light, ASE noise generated in the optical amplifier provided in the network is added to a signal component (see spectrum-32), causing a degradation in OSNR (optical signal-to-noise ratio) characteristic.

Figure 1:
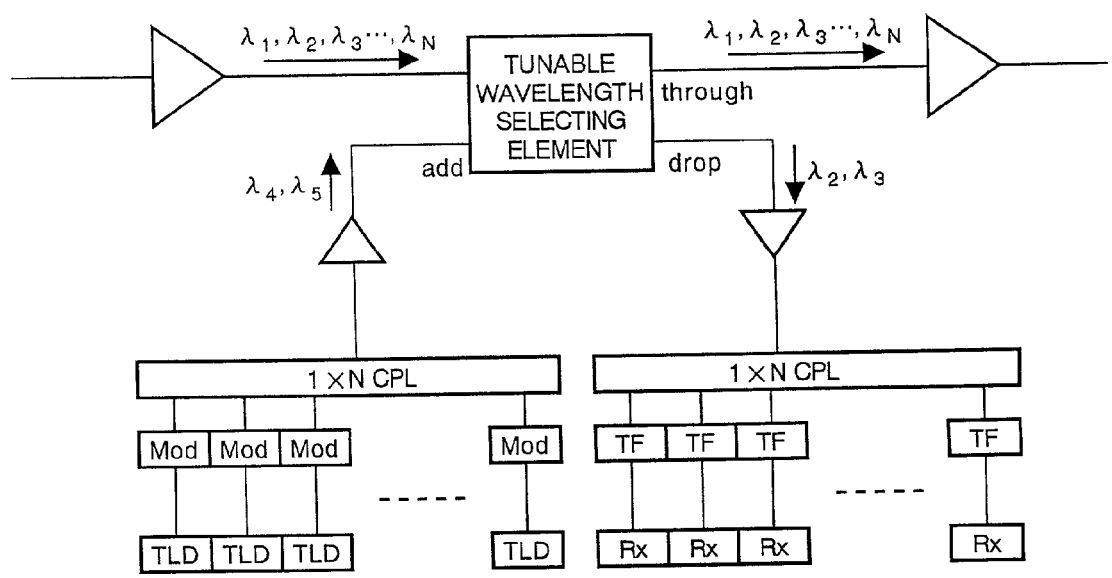
FIG. 1 is a block diagram of an optical node device in the prior art.
Figure 2:
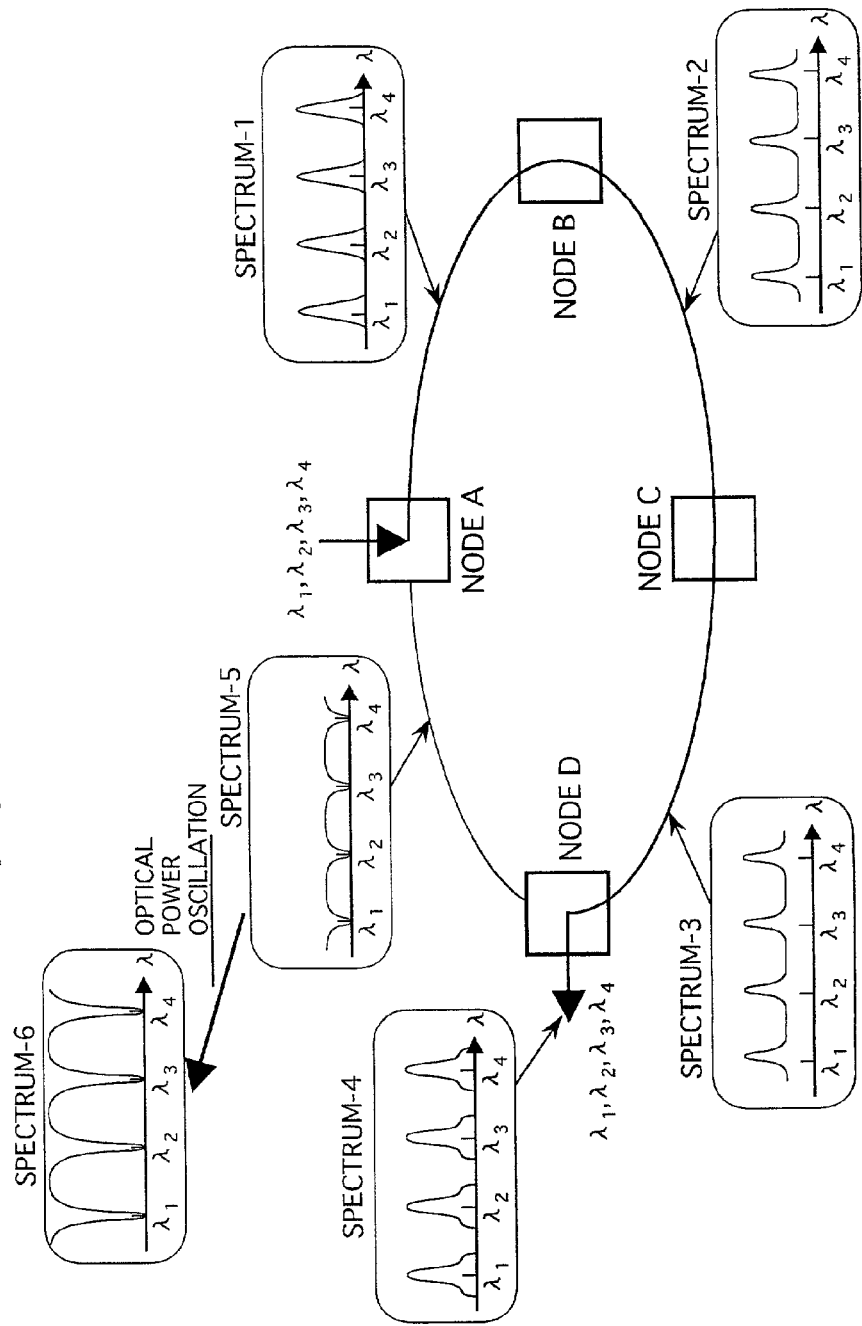
FIG. 2 is a block diagram for illustrating the oscillation of optical power in an optical ring network in the prior art.
Figure 3:
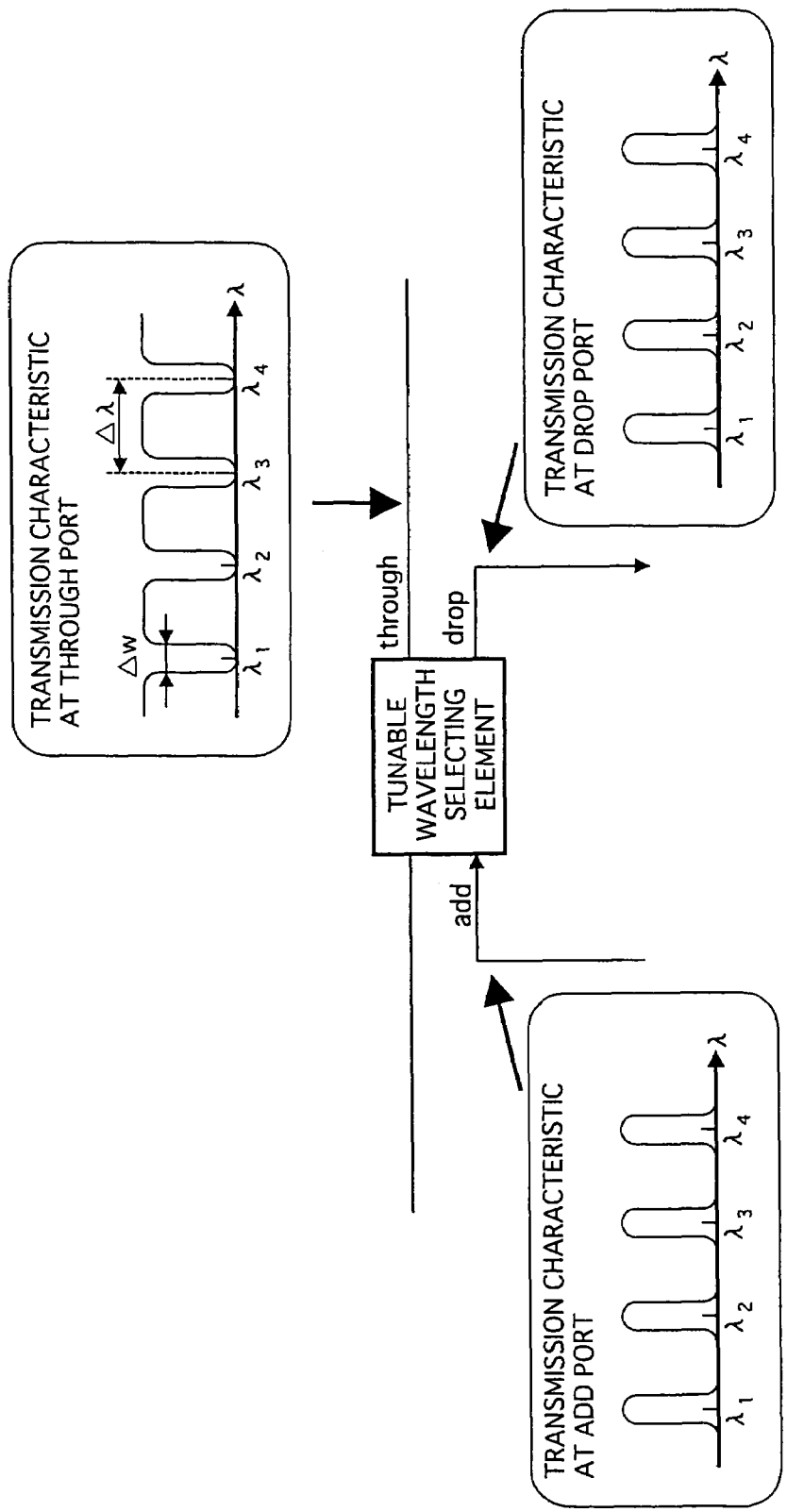
FIG. 3 is a block diagram showing an example of the transmission characteristic of a tunable wavelength selecting element in the prior art.

At the node B, the optical signal of the wavelength $\lambda_3$ is dropped (see spectrum-33). The optical signals of the remaining wavelengths $\lambda_1$, $\lambda_2$, and $\lambda_4$ are passed through the node B toward the node C. The light passing through the node B is the remainder obtained by extracting the signal band including the wavelength $\lambda_3$ from the WDM signal light input into the node B, by means of the tunable wavelength selecting element 2 provided in the node B. The tunable wavelength selecting element 2 has a transmission characteristic as shown in FIG. 3, for example, so that only the signal band including the wavelength $\lambda_3$ is suppressed at the node B and the remaining signal bands are passed through the node B. Accordingly, the light passing through the node B has spectrum-34.

It should be noted herein that an ASE noise component present in a band between any adjacent ones of the wavelength channels is also passed through the node B. At the node C, the optical signal of the wavelength $\lambda_1$ is dropped as at the node B (see spectrum-35). The optical signals of the remaining wavelengths $\lambda_2$ and $\lambda_4$ are passed through the node C toward the node D. Thus, the light passing through the node C is the remainder obtained by extracting the signal band including the wavelength $\lambda_1$ from the WDM signal light input into the node C, by means of the tunable wavelength selecting element 2 provided in the node C (see spectrum-36).

At the node D, the optical signals of the wavelengths $\lambda_2$ and $\lambda_4$ passed through the node C and transmitted by the optical fiber are dropped (see spectrum-37). Since the present invention is applied to the node D, optical power present in any bands other than the signal band is suppressed.

As a result, the light passing through the node D includes no signals as shown in spectrum-38. Accordingly, the circulation of the ASE noise in the WDM optical ring network can be prevented, thus effectively suppressing the oscillation of optical power.

While the present invention is applied to only one node (the node D) of the plural nodes arranged along the closed loop in the preferred embodiment shown in FIG. 11, the optical node device according to the present invention may be used as two or more nodes.

Figure 12:
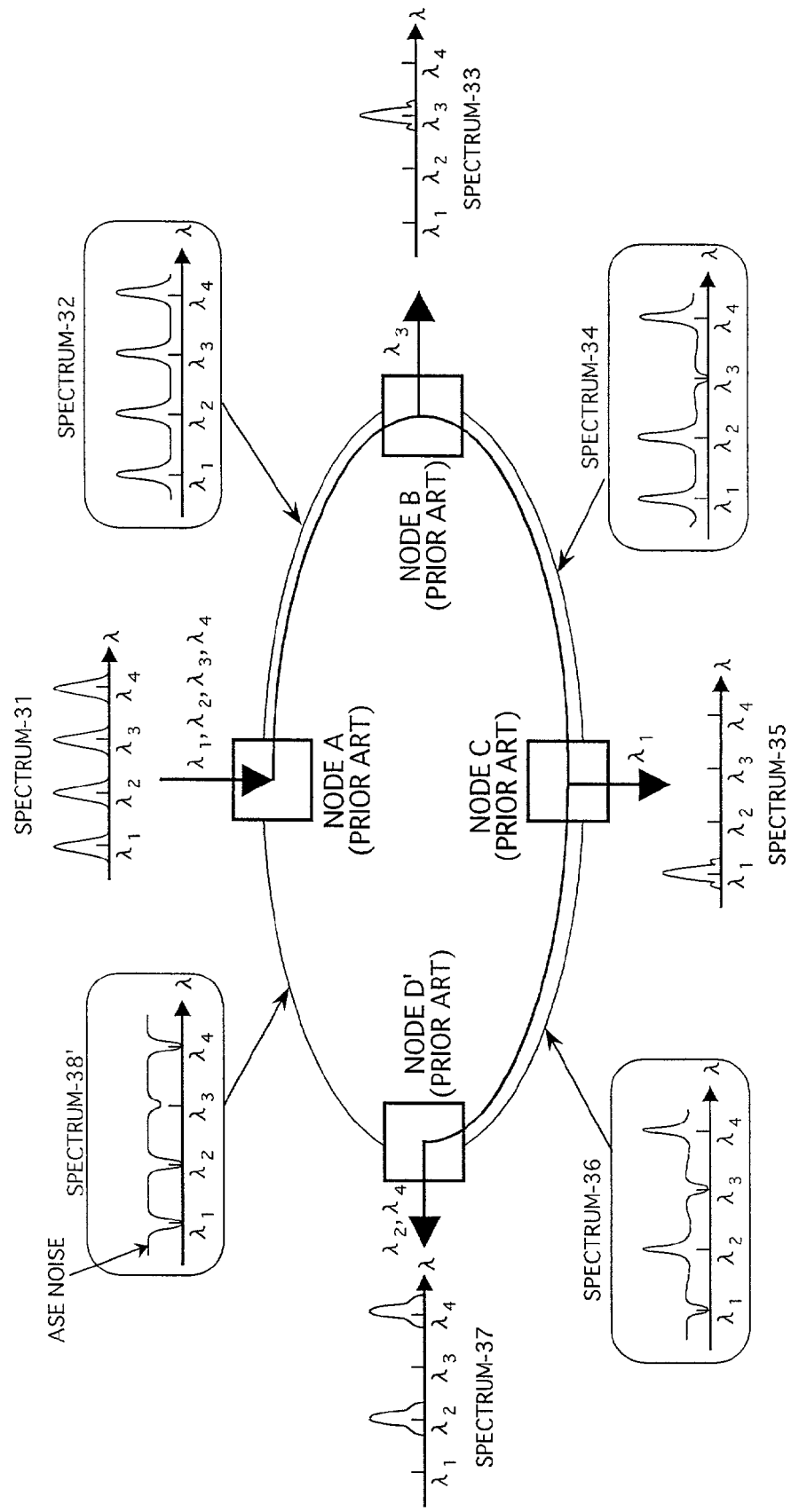
FIG. 12 is a block diagram showing a system in the prior art.

Referring to FIG. 12, there is shown a prior art network to be contrasted with the preferred embodiment shown in FIG. 11. In FIG. 12, a node D' in the prior art is used in place of the node D shown in FIG. 11. As shown in spectrum-38' in FIG. 12, the light propagating between the node D' and the node A includes ASE noise left in the band between the adjacent wavelength channels. Accordingly, in the prior art shown in FIG. 12, there is a possibility of the circulation of this noise component in the WDM optical ring network to cause the oscillation of optical power.

Figure 13:
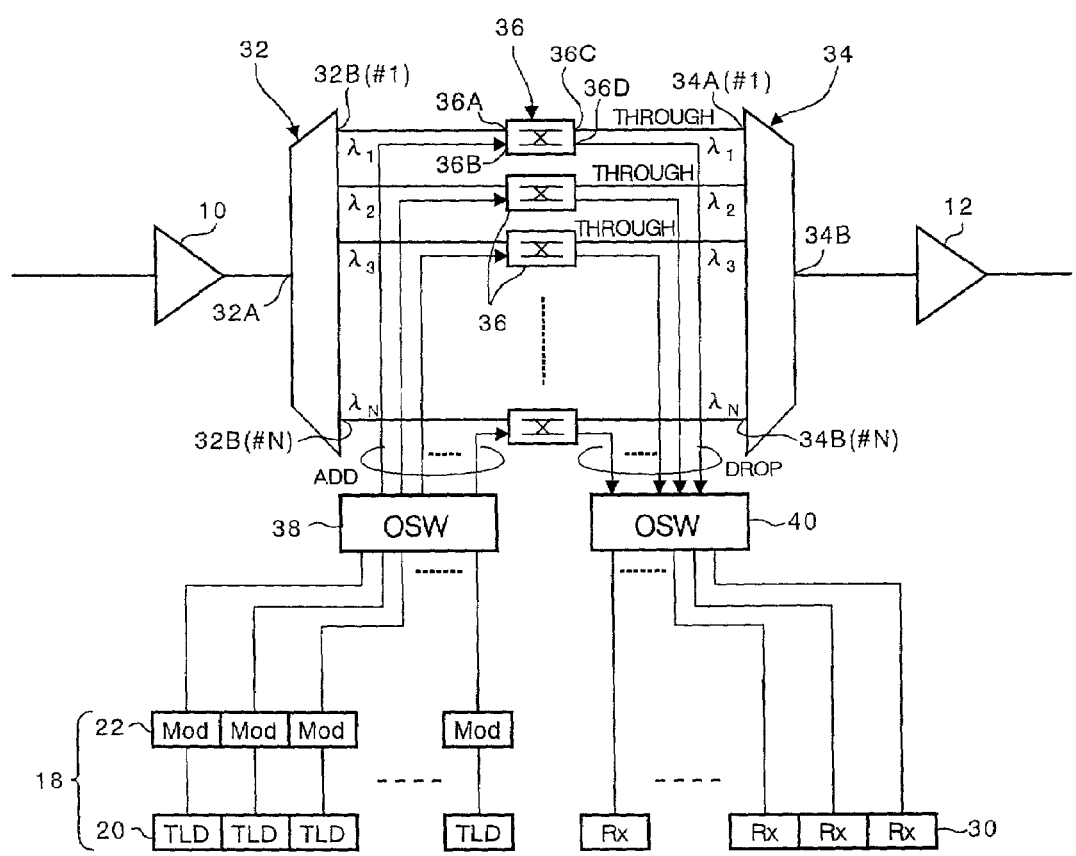
FIG. 13 is a block diagram showing a fourth preferred embodiment of the optical node device according to the present invention.

FIG. 13 is a block diagram showing a fourth preferred embodiment of the optical node device according to the present invention. As similar to the preferred embodiment shown in FIG. 6, the preferred embodiment shown in FIG. 13 employs optical amplifiers 10 and 12, optical transmitters 18 (tunable laser diodes 20 and optical modulators 22), optical receivers 30, an optical demultiplexer 32, and an optical multiplexer 34. This preferred embodiment is characterized in that N 2×2 optical switches 36 are provided to switch among signal adding, dropping, and passing, and that optical switches (OSW) 38 and 40 are provided as an add switch and a drop switch, respectively.

Each 2×2 optical switch 36 has two input ports 36A and 36B and two output ports 36C and 36D, and functions to switch between a bar state where the input ports 36A and 36B are connected to the output ports 36C and 36D, respectively, and a cross state where the input ports 36A and 36B are connected to the output ports 36D and 36C, respectively.

The optical demultiplexer 32 has an input port 32A for inputting WDM signal light obtained by wavelength division multiplexing N optical signals having different wavelengths, and N output ports 32B(#1) to 32B(#N) for respectively outputting the N optical signals separated from the WDM signal light. The N optical signals output from the optical demultiplexer 32 are supplied to the input ports 36A of the N 2×2 optical switches 36, respectively. N optical signals output from the output ports 36C of the N 2×2 optical switches 36 are wavelength division multiplexed by the optical multiplexer 34.

The optical switch 38 has N output ports connected to the input ports 36B of the N 2×2 optical switches 36, respectively, and a plurality of input ports connected to the plural optical transmitters 18, respectively. The optical switch 38 may be provided by an N x N optical switch. The optical switch 38 functions to switch the connections between the optical transmitters 18 for outputting optical signals to be added to any unassigned channels of the WDM signal light and the input ports 36B of the N 2×2 optical switches 36. on the other hand, the optical switch 40 has N input ports connected to the output ports 36D of the N 2×2 optical switches 36, respectively, and a plurality of output ports connected to the plural optical receivers 30, respectively. The optical switch 40 may be provided by an N×N optical switch. The optical switch 40 functions to switch the connections between the optical receivers 30 for receiving optical signals dropped from the WDM signal light and the output ports 36D of the N 2×2 optical switches 36.

Also according to this preferred embodiment, the circulation of ASE noise in a WDM optical ring network can be prevented on the principle similar to that of the wavelength selecting filter 4 shown in FIG. 6, thus effectively suppressing the oscillation of optical power.

Figure 14:
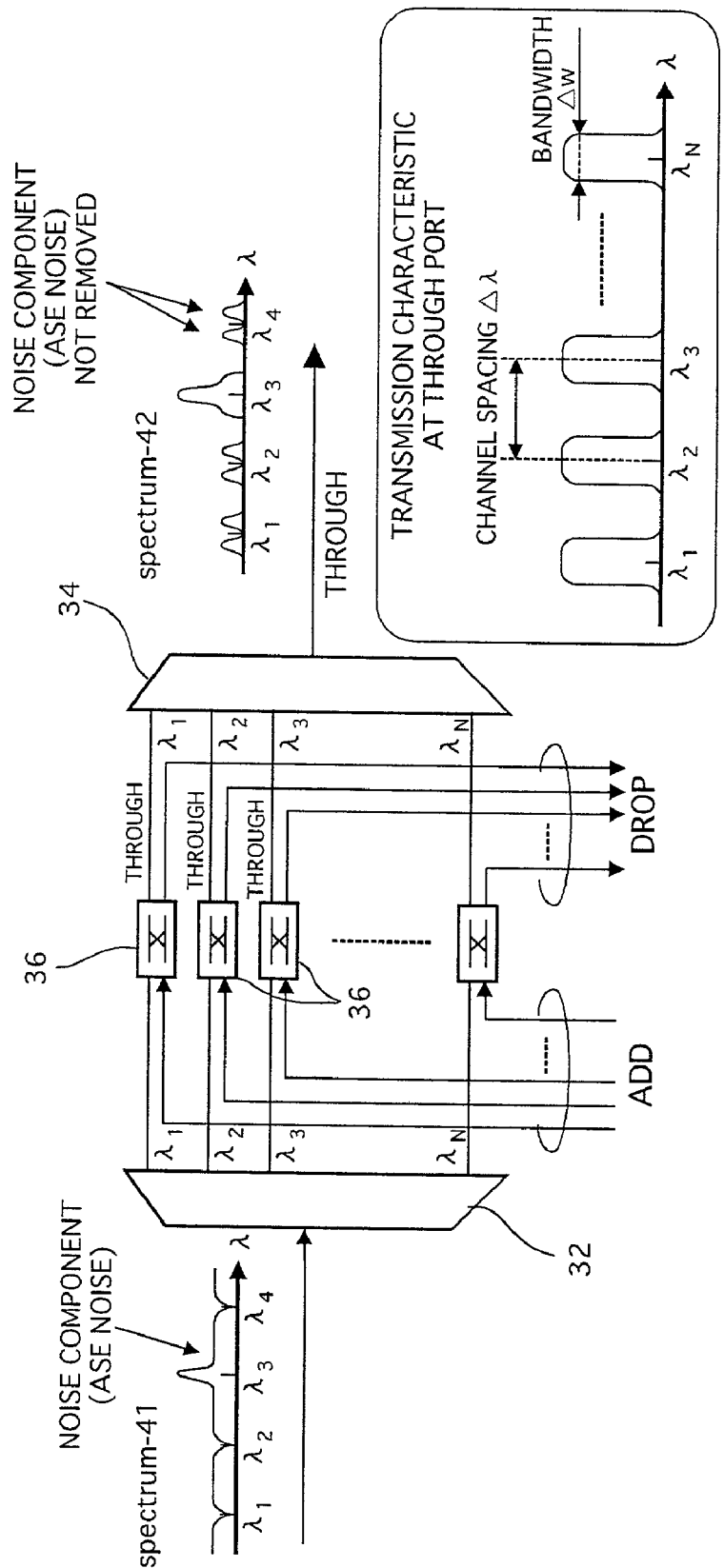
FIG. 14 is a block diagram showing spectra in the case that a transmission band per wavelength channel is wider than a signal band in the preferred embodiment shown in FIG. 13.

Referring to FIG. 14, there are shown spectra at various points in the optical node device shown in FIG. 13 in the case that the transmission band of each of the optical demultiplexer 32 and the optical multiplexer 34 per wavelength channel is wider than the signal band. In this case, WDM signal light including an ASE noise component (spectrum-41) is input into the optical demultiplexer 32. That is, the light input into the optical demultiplexer 32 includes not only a signal component having a wavelength $\lambda_3$ but also an ASE noise component as shown in the spectrum-41. The transmission bandwidth $\Delta w$ of each of the optical demultiplexer 32 and the optical multiplexer 34 per wavelength channel is larger than the signal bandwidth, so that the light output from the optical multiplexer 34 includes an ASE noise component left near each signal wavelength as shown in spectrum-42. If this noise component circulates within a WDM optical ring network, there is a possibility of the oscillation of optical power. A preferred embodiment for solving this problem in the whole of a system will now be described.

Figure 15:
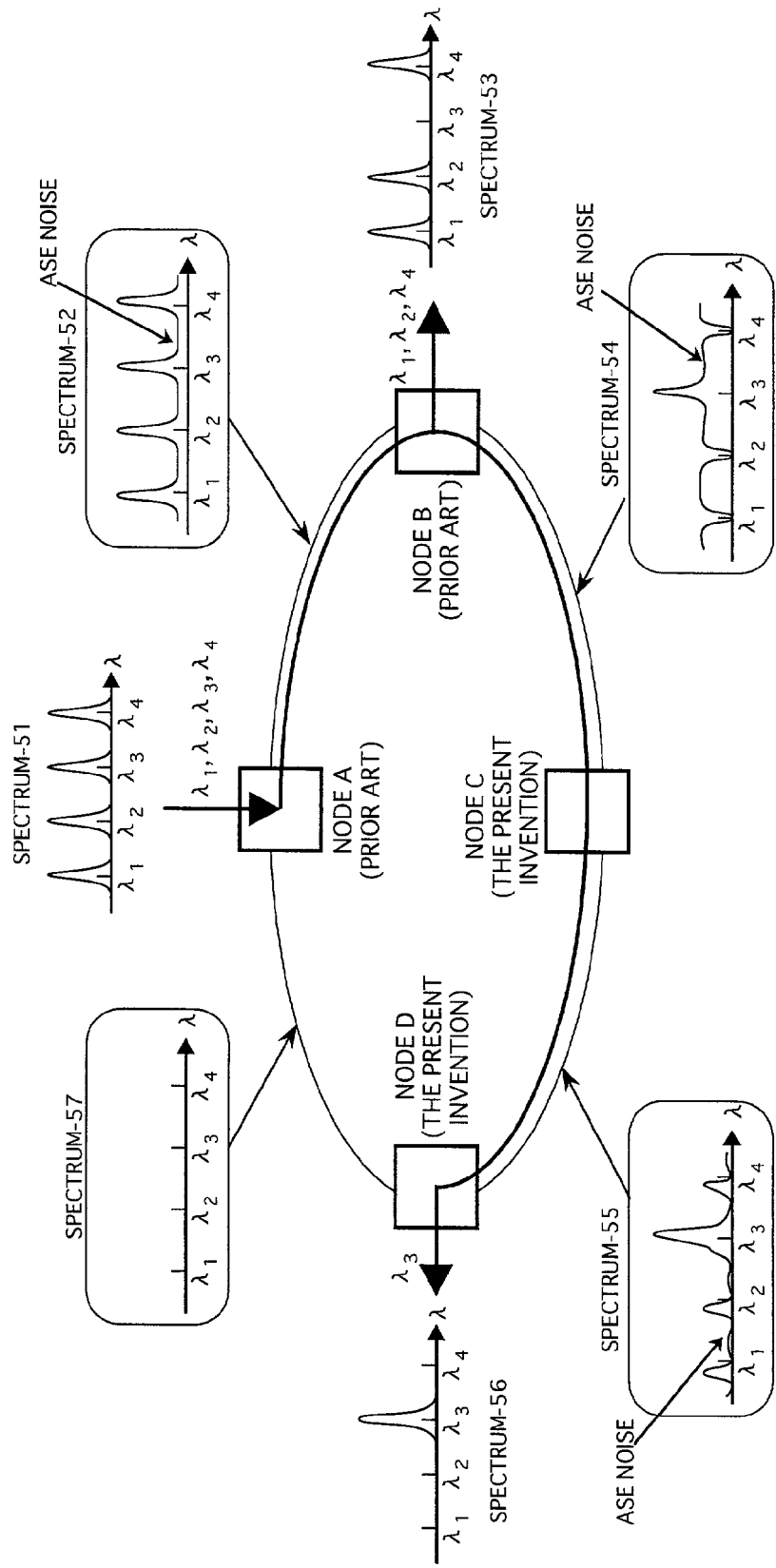
FIG. 15 is a block diagram showing a second preferred embodiment of the system according to the present invention.

FIG. 15 is a block diagram showing a second preferred embodiment of the system according to the present invention. In this preferred embodiment, the prior art is applied to nodes A and B, and the present invention is applied to nodes C and D. The nodes A to D are arranged along a closed loop provided by an optical fiber, thereby configuring a WDM optical ring network.

The optical node device shown in FIG. 13, for example, may be used as each of the nodes C and D. The transmission bandwidth $\Delta w$ of each of the optical demultiplexer 32 and the optical multiplexer 34 used in each node is larger than the signal bandwidth. Further, the central wavelength of each of the optical demultiplexer 32 and the optical multiplexer 34 in the node C is set to $(\lambda_C-\Delta\lambda)$, and the central wavelength of each of the optical demultiplexer 32 and the optical multiplexer 34 in the node D is set to $(\lambda_C+\Delta\lambda)$.

WDM signal light having four wavelength channels of wavelengths $\lambda_1$ to $\lambda_4$ added to the node A (see spectrum-51) propagates clockwise in the optical ring network. At the node B, the optical signals of the wavelengths $\lambda_1$, $\lambda_2$, and $\lambda_4$ are dropped (see spectrum-53). The optical signal of the remaining wavelength $\lambda_3$ is passed through the node B toward the node C, and this optical signal is next passed through the node C toward the node D.

The light passing through the node C includes ASE noise present at shorter wavelengths with respect to the central wavelength of each signal band as shown in spectrum-55. At the node D, the optical signal of the wavelength $\lambda_3$ is dropped (see spectrum-56).

Figure 16:
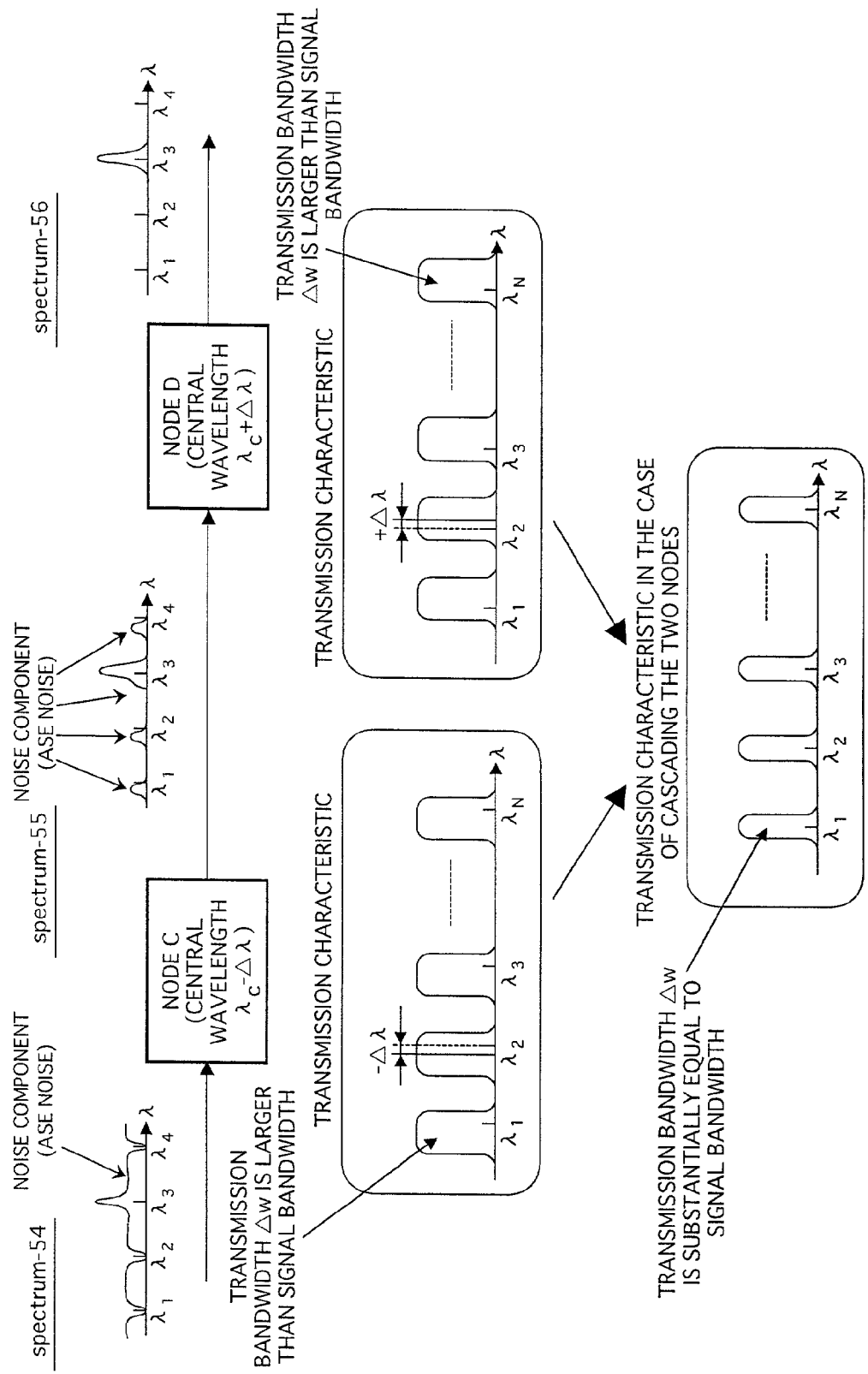
FIG. 16 is a block diagram for illustrating the case of using two optical node devices each having a characteristic such that a transmission band per wavelength channel is wider than a signal band and a center wavelength per wavelength channels is different.

Accordingly, the light passing through the node D excludes the ASE noise present at shorter wavelengths with respect to the central wavelength of each signal band (see spectrum-55) as shown in spectrum-57. Thus, by cascading two kinds of optical node devices according to the present invention wherein one of the optical node devices has an optical demultiplexer and an optical multiplexer each having a first central wavelength per wavelength channel, and the other optical node device has an optical demultiplexer and an optical multiplexer each having a second central wavelength per wavelength channel different from the first central wavelength, and by making the transmission bandwidth Δw per wavelength channel substantially equal to the signal bandwidth as shown in FIG. 16, the ASE noise present in the band between the adjacent wavelength channels can be effectively suppressed to thereby prevent the oscillation of optical power.

Figure 17:
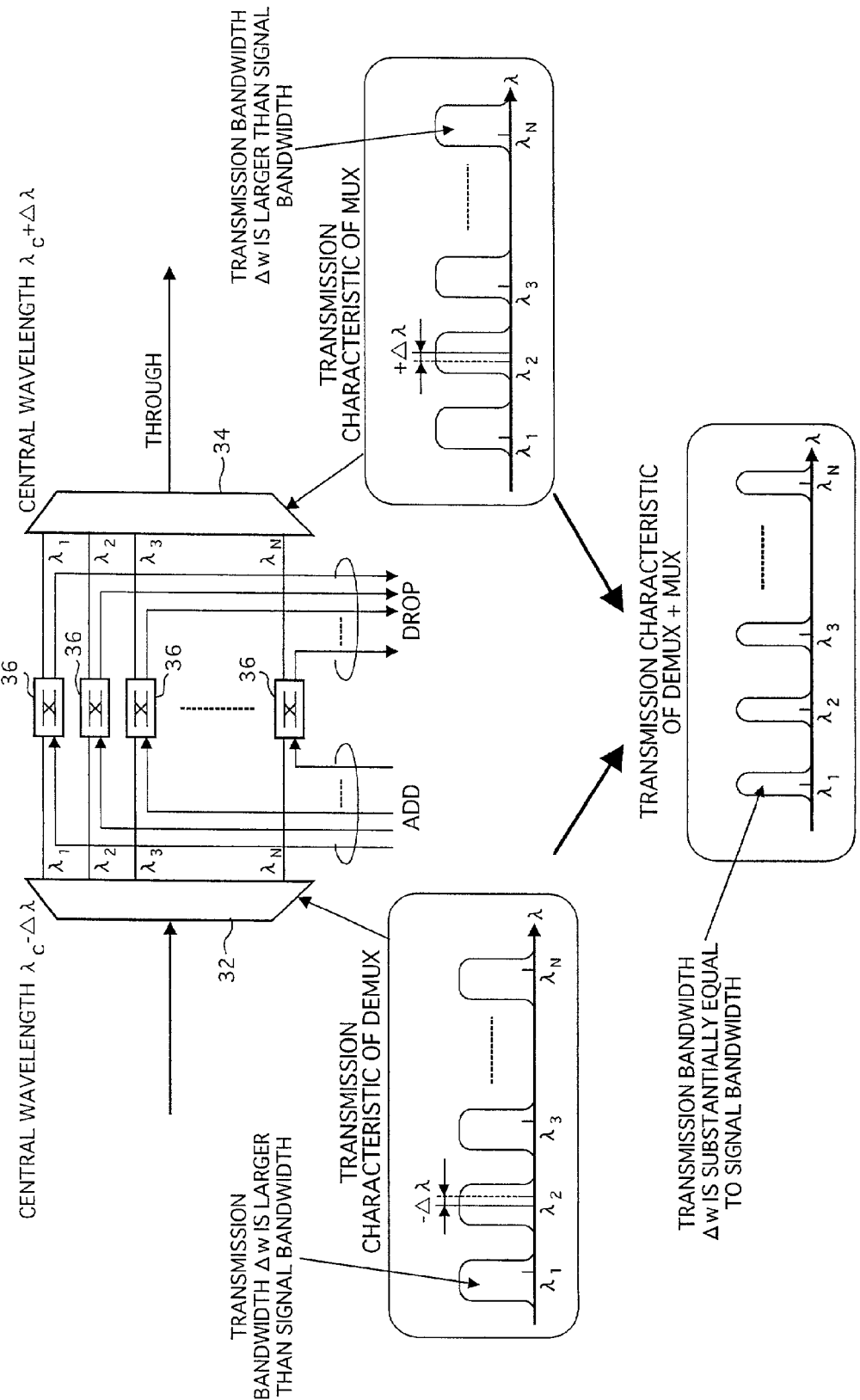
FIG. 17 is a block diagram showing a fifth preferred embodiment of the optical node device according to the present invention.

FIG. 17 is a block diagram showing a fifth preferred embodiment of the optical node device according to the present invention. In contrast to the preferred embodiment shown in FIG. 14 wherein the central wavelength of each of the optical demultiplexer 32 and the optical multiplexer 34 is set to $\lambda_C$, the preferred embodiment shown in FIG. 17 is characterized in that the central wavelength of the optical demultiplexer 32 is set to ($\lambda_C$−Δλ) and the central wavelength of the optical multiplexer 34 is set to ($\lambda_C$+Δλ). This preferred embodiment can also exhibit a similar effect such that even in the case that the transmission band of each of the optical demultiplexer 32 and the optical multiplexer 34 per wavelength channel is wider than the signal band, the ASE noise present in the band between the adjacent wavelength channels can be suppressed to thereby effectively suppress the oscillation of optical power.

Figure 18:
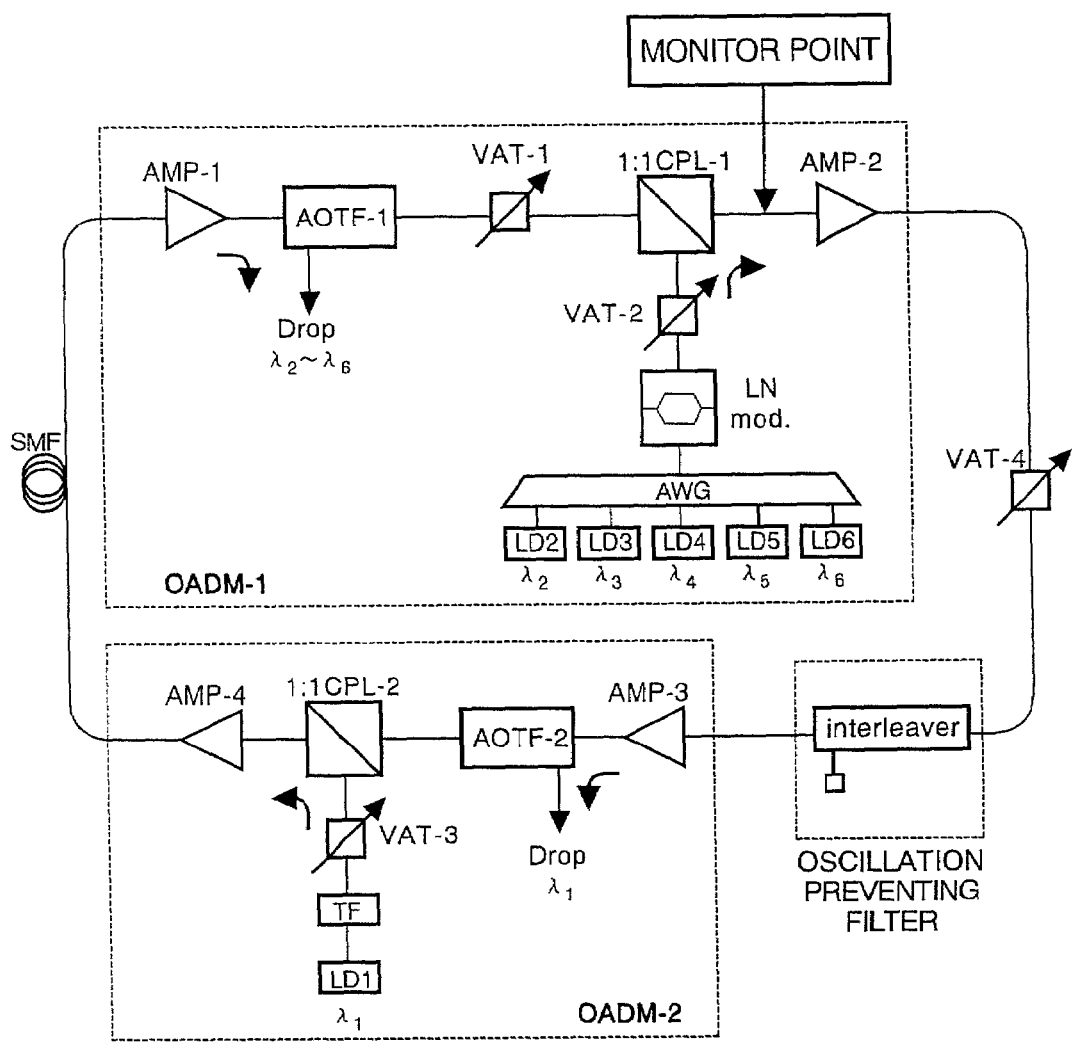
FIG. 18 is a block diagram showing an experimental system for verifying the serviceability of the present invention.

An experiment for verifying the serviceability of the present invention will now be described with reference to FIGS. 18 to 20. In FIG. 18, OADM is an optical add/drop multiplexer, SMF is a single-mode fiber, AMP is an optical amplifier (an EDFA is used in this experiment), AOTF is an acousto-optic tunable filter, VAT is a variable optical attenuator, CPL is a coupler, LN mod. is a lithium niobate modulator, AWG is an arrayed waveguide grating, LD is a laser diode, and interleaver is an interleaver as a filter for preventing the oscillation of optical power.

In this experimental system, the OADM-1, OADM-2, VAT-4, and interleaver are arranged along a closed loop provided by the SMF. The VAT-4 is used as a loss source for a transmission line. In the OADM-1, lights having wavelengths $\lambda_2$ to $\lambda_6$ output from the light sources (LD2 to LD6) are wavelength division multiplexed by the AWG, next modulated at 10 Gb/s by the LN mod. as a polarization independent type modulator, and next added to the transmission line. The WDM signal light added is passed through the power oscillation preventing filter (interleaver) and the OADM-2 to circulate once in this closed loop. Thereafter, the WDM signal light is dropped off at the AOTF-1 in the OADM-1.

In the OADM-2, a signal having a wavelength $\lambda_1$ is added through the tunable filter (TF) to the transmission line, and passed through the OADM-1 and the interleaver to circulate once in this closed loop. Thereafter, this signal is dropped off at the AOTF-2 in the OADM-2.

Figure 19:
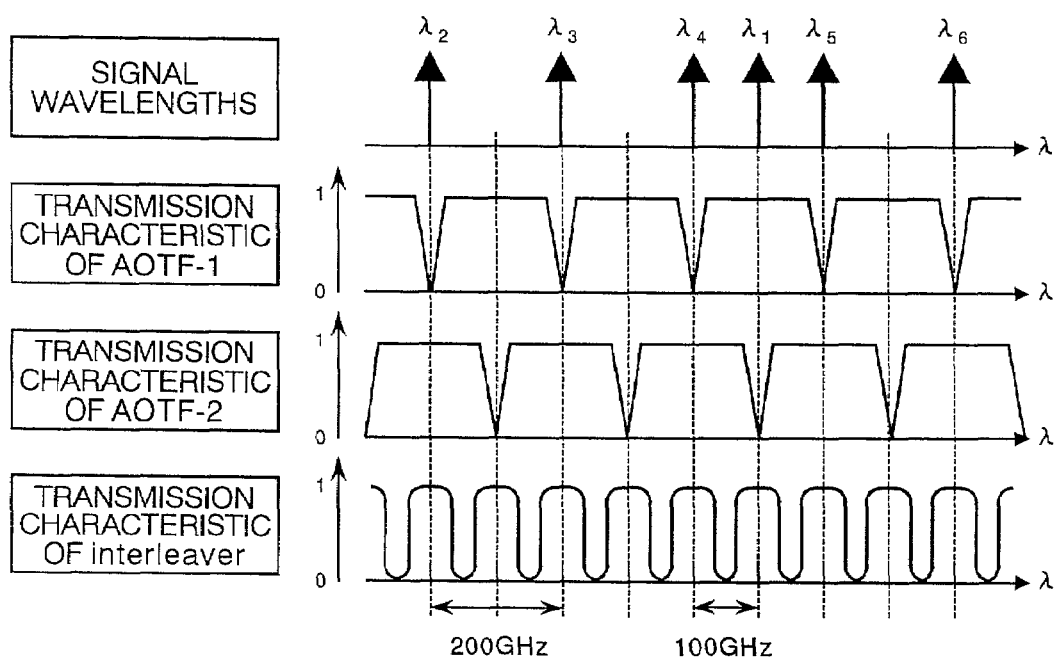
FIG. 19 is a chart showing the arrangement of signal wavelengths and the transmission characteristics of components in the experimental system shown in FIG. 18.

Referring to FIG. 19, there are shown the arrangement of the signal wavelengths and the transmission characteristics of the AOTF-1, AOTF-2, and interleaver shown in FIG. 18. The arrangement of the signal wavelengths $\lambda_2$ to $\lambda_6$ corresponds to the even-numbered channels of the ITU grid having 100 GHz spacing, and the arrangement of the signal wavelength $\lambda_1$ corresponds to the odd-numbered channel between the wavelengths $\lambda_4$ and $\lambda_5$.

The AOTF-1 rejects the even-numbered channels at 200 GHz spacing, and the AOTF-2 rejects the odd-numbered channels at 200 GHz spacing. The interleaver may be a 50/100 GHz interleaver. In this case, a signal is output at 100 GHz spacing from some port of the interleaver. Accordingly, the output spacing at this port is in coincidence with the signal wavelength spacing, so that an optical coupler to be provided on the output side of the interleaver is not necessary. In the case that a 100/200 GHz interleaver is used as the interleaver, an optical coupler is provided according to the present invention.

Thus, a noise component (ASE noise component) present in any bands other than each signal band, which noise component is not suppressed in the AOTF-1 and the AOTF-2, can be removed by the interleaver arranged at one position along the closed loop, thereby suppressing the oscillation of optical power.

Referring to FIG. 20, there are shown spectra measured at a monitor point shown in FIG. 18 under four conditions. The four conditions are provided by any combinations of the presence/absence of the oscillation preventing filter (interleaver) and two kinds of loop gain (0 dB and +10 dB). In the case that the loop gain is equal to a loop loss and it is 0 dB, it is understood that the oscillation of optical power does not occur regardless of the presence/absence of the oscillation preventing filter. In the case that the loop gain is greater than the loop loss (+10 dB) and that the oscillation preventing filter is absent, it is understood that the oscillation of optical power occurs because of ASE present at longer wavelengths with respect to the wavelength $\lambda_6$. In contrast thereto, in the case that the loop gain is greater than the loop loss (+10 dB) and that the oscillation preventing filter is used, it is understood that the ASE noise component present in any bands other than each signal band is suppressed to prevent the oscillation of optical power, thus experimentally verifying the serviceability of the present invention.

According to the present invention as described above, it is possible to provide an optical node device and a system including this device which can effectively prevent a degradation in transmission characteristics due to the oscillation of optical power. As a result, a reliable, space-saving, and low-cost optical node device and a system including this device can be provided. The effects obtained by the specific preferred embodiments of the present invention have been described above, so the description thereof will be omitted herein.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A system comprising:
    a closed loop provided by an optical fiber; and
    a plurality of optical node devices arranged along said closed loop;
    each of said plurality of optical node device comprising:
    a tunable wavelength selecting element adapted to input WDM signal light obtained by wavelength division multiplexing a plurality of optical signals having different wavelengths, said tunable wavelength selecting element having a function of dropping at least one optical signal from said WDM signal light and a function of adding at least one optical signal to at least one unassigned wavelength channel of said WDM signal light; and
    a wavelength selecting filter optically connected to said tunable wavelength selecting element for removing noise present in any bands other than a signal band of each optical signal passing through said tunable wavelength selecting element;
    said wavelength selecting filter comprising:
    an optical demultiplexer having an input port for inputting WDM signal light output from said tunable wavelength selecting element and N output ports for respectively outputting said N optical signals separated from said WDM signal light, and an optical multiplexer having N input ports for respectively inputting N optical signals output from said optical demultiplexer, and an output port for outputting WDM signal light obtained by wavelength division multiplexing said N optical signals input to said N input ports;

wherein said transmission band of each of said optical demultiplexer and said optical multiplexer per wavelength channel is wider than the band of each wavelength channel of said WDM signal light;

wherein transmission bands per wavelength channel of said optical demultiplexer and multiplexer have central wavelengths shifted from the central wavelength of each wavelength channel of said WDM signal light toward shorter wavelength and longer wavelength, respectively, or transmission bands per wavelength channel of said optical demultiplexer and multiplexer have central wavelengths shifted from the central wavelength of each wavelength channel of said WDM signal light toward longer wavelength and shorter wavelength, respectively.

2. A system according to claim 1, further comprising at least one optical amplifier arranged along said closed loop.

3. A system according to claim 1, wherein said tunable wavelength selecting element has a first input port for inputting said WDM signal light, a second input port for inputting an optical signal to be added to said WDM signal light, a first output port for outputting an optical signal to be passed through said tunable wavelength selecting element, and a second output port for outputting an optical signal to be dropped from said WDM signal light.

4. A system according to claim 3, wherein said at least one optical node device further comprises:
an optical coupler having a plurality of input ports and an output port connected to said second input port of said tunable wavelength selecting element;
an optical modulator connected to each of said plurality of input ports of said optical coupler; and
a tunable light source connected to said optical modulator.

5. A system according to claim 3, wherein said at least one optical node device further comprises:
an optical coupler having an input port connected to said second output port of said tunable wavelength selecting element, and a plurality of output ports;
a tunable filter connected to each of said plurality of output ports of said optical coupler; and
an optical receiver connected to said tunable filter.

6. A system comprising:
a closed loop provided by an optical fiber; and
a plurality of optical node devices arranged along said closed loop, said plurality of optical node devices including a first optical node device and a second optical node device, said first and second optical node devices comprising:
a tunable wavelength selecting element adapted to input WDM signal light obtained by wavelength division multiplexing a plurality of optical signals having different wavelengths, said tunable wavelength selecting element having a function of dropping at least one optical signal from said WDM signal light and a function of adding at least one optical signal to at least one unassigned wavelength channel of said WDM signal light; and
a wavelength selecting filter optically connected to said tunable wavelength selecting element for removing noise present in any bands other than a signal band of each optical signal passing through said tunable wavelength selecting element, said wavelength selecting filter comprising an optical demultiplexer and an optical multiplexer, said optical demultiplexer having an input port for inputting WDM signal light output from said tunable wavelength selecting element and N output ports for respectively outputting N optical signals separated from said WDM signal light, said optical multiplexer having N input ports for respectively inputting said N optical signals output from said optical demultiplexer and an output port for outputting WDM signal light obtained by wavelength division multiplexing said N optical signals input to said N input ports, wherein said transmission band of each of said optical demultiplexer and said optical multiplexer per wavelength channel is wider than the band of each wavelength channel of said WDM signal light;

wherein said wavelength selecting filters of said first optical node device and said second optical node device have transmission bands per wavelength channel of which central wavelengths are shifted from the central wavelength of each wavelength channel of said WDM signal light toward shorter wavelength and longer wavelength, respectively, or said wavelength selecting filters of said first optical node device and said second optical node device have transmission bands per wavelength channel of which central wavelengths are shifted from the central wavelength of each wavelength channel of said WDM signal light toward longer wavelength and shorter wavelength, respectively.

7. A system according to claim 6, wherein:
said N-input ports of said optical multiplexer being optically connected to said output ports of said optical demultiplexer, respectively;
said optical demultiplexer and said optical multiplexer being arranged along said closed loop.

8. A system according to claim 7, wherein:
said WDM signal light has a plurality of wavelength channels arranged at substantially equal intervals in the wavelength domain;
said input port and said i-th (i is an integer satisfying $1 \leq i \leq N$) output port of said optical demultiplexer are coupled by said transmission band of said optical demultiplexer including the wavelength of any one said wavelength channels;
said j-th (j is an integer satisfying $1 \leq j \leq N$) input port and said output port of said optical multiplexer are coupled by said transmission band of said optical multiplexer including the wavelength of any one of said wavelength channels.

9. A system according to claim 7, wherein each of said optical demultiplexer and said optical multiplexer comprises an arrayed wavelength grating.

10. A system according to claim 6, wherein said tunable wavelength selecting element comprises an acousto-optical tunable filter.

11. A system according to claim 6, wherein said tunable wavelength selecting element has a first input port for inputting and WDM signal light, a second input port for inputting an optical signal to be added to said WDM signal light, a first output port for outputting an optical signal to be passed through said tunable wavelength selecting element, and a second output port for outputting an optical signal to be dropped from said WDM signal light.

12. A system according to claim 11, further comprising:
an optical coupler having a plurality of input ports and an output port connected to said second input port of said tunable wavelength selecting element;

an optical modulator connected to each of said plurality of input ports of said tunable wavelength selecting element; and a tunable light source connected to said optical modulator.

13. A system according to claim 11, further comprising:

an optical coupler having an input port connected to said second output port of said tunable wavelength selecting element, and a plurality of output ports;

a tunable filter connected to each of said plurality of output ports of said optical coupler;

an optical receiver connected to said tunable filter.

14. A system according to claim 6, further comprising an optical amplifier connected to said tunable wavelength selecting element.

* * * * *